US009008152B2

(12) United States Patent
Garikipati et al.

(10) Patent No.: US 9,008,152 B2
(45) Date of Patent: Apr. 14, 2015

(54) METHOD, APPARATUS, AND COMPUTER PROGRAM PRODUCT FOR WIRELESS SIGNALING

(71) Applicant: Nokia Corporation, Espoo (FI)

(72) Inventors: Krishna C. Garikipati, Ann Arbor, MI (US); Sayantan Choudhury, Berkeley, CA (US)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/010,921

(22) Filed: Aug. 27, 2013

(65) Prior Publication Data

US 2015/0063128 A1 Mar. 5, 2015

(51) Int. Cl.
*H04B 1/00* (2006.01)
*H04W 24/08* (2009.01)

(52) U.S. Cl.
CPC ..................... *H04W 24/08* (2013.01)

(58) Field of Classification Search
USPC ......... 375/141, 146, 147, 219, 220, 221, 260, 375/267, 285; 370/312, 320, 346, 347, 349, 370/432, 449, 457, 461, 462; 455/63.1, 455/67.11, 69
See application file for complete search history.

(56) References Cited

U.S. PATENT DOCUMENTS 8,238,958 B2 * 8/2012 Bourlas et al. ................. 455/522
8,270,515 B2 9/2012 Ashikhmin
8,429,506 B2 4/2013 Kotecha
2004/0087308 A1 5/2004 Tirkkonen et al.
(Continued)

FOREIGN PATENT DOCUMENTS

EP 2176959 A1 4/2010

OTHER PUBLICATIONS

Kim, Taejoon, et al. "Simultaneous polling mechanism for low power sensor networks using ZC sequences." Personal Indoor and Mobile Radio Communications (PIMRC), 2012 IEEE 23rd International Symposium on. IEEE, 2012.
(Continued)

*Primary Examiner* — Dac Ha
(74) *Attorney, Agent, or Firm* — Banner & Witcoff, Ltd.

(57) ABSTRACT

Embodiments of the invention provide signaling mechanisms for wireless networks composed of a large number of stations. An example method embodiment comprises: storing, by a wireless device, a prior channel estimate that was previously transmitted to another wireless device in a wireless network; receiving, by the wireless device, a request message from the other device, to determine a distortion between a current channel estimate and the prior channel estimate and compare the determined distortion to a distortion threshold value, the request message being a broadcast request message or a measurement request message and the distortion value being either included in the request message, received in another message, or a preconfigured value; determining, by the wireless device, the distortion between the current channel estimate and the prior channel estimate and comparing the determined distortion to the distortion threshold value; and transmitting, by the wireless device, one or more parallel or sequential messages to the other device, indicating presence of the determined distortion greater than the distortion threshold value or indicating an inability to determine a distortion in channel estimates.

20 Claims, 19 Drawing Sheets

(56) References Cited

U.S. PATENT DOCUMENTS

| | | | |
|---|---|---|---|
| 2009/0034636 A1 | 2/2009 | Kotecha et al. | |
| 2011/0273977 A1 | 11/2011 | Shapira | |
| 2011/0299480 A1* | 12/2011 | Breit et al. | 370/329 |
| 2012/0026991 A1 | 2/2012 | Niu | |
| 2012/0033592 A1 | 2/2012 | Kim | |
| 2012/0087426 A1 | 4/2012 | Zhang | |
| 2012/0230443 A1 | 9/2012 | Seok | |
| 2013/0114491 A1 | 5/2013 | Kim et al. | |
| 2013/0188567 A1* | 7/2013 | Wang et al. | 370/329 |
| 2013/0308715 A1* | 11/2013 | Nam et al. | 375/267 |

OTHER PUBLICATIONS

Porat, Ron et al. "Improved MU-MIMO Performance for Future. 802.11 Systems Using Differential Feedback", Information Theory and Applications Workshop, ITA 2013.

"IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications", IEEE Std 802.11, Mar. 29, 2012, pp. 1-2793.

* cited by examiner

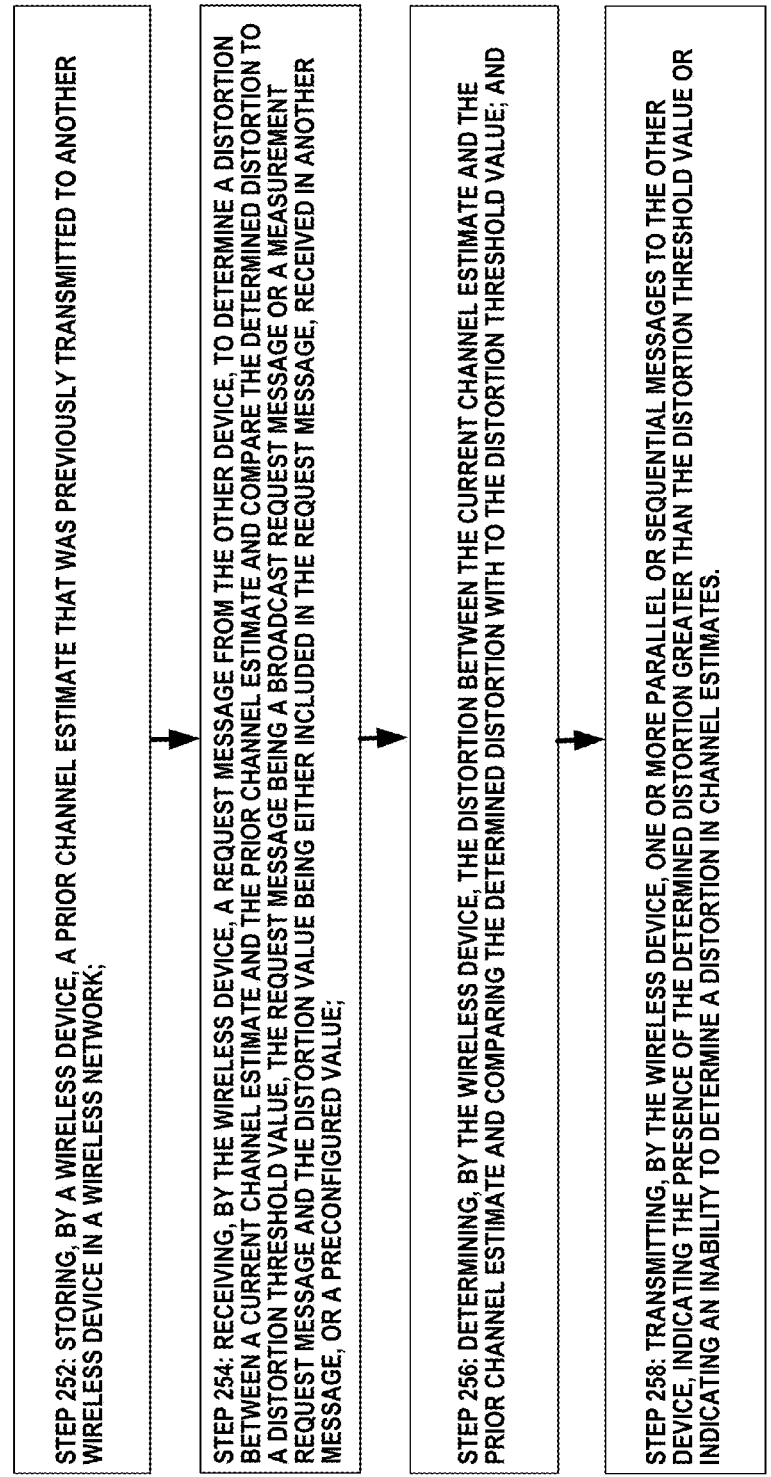

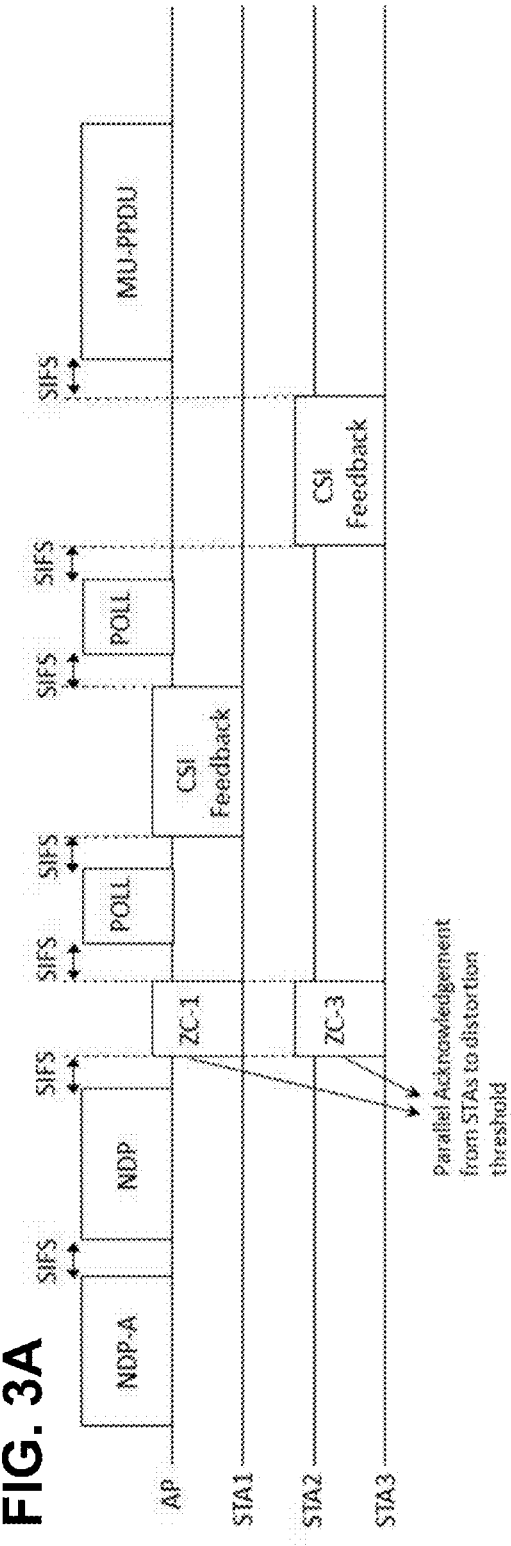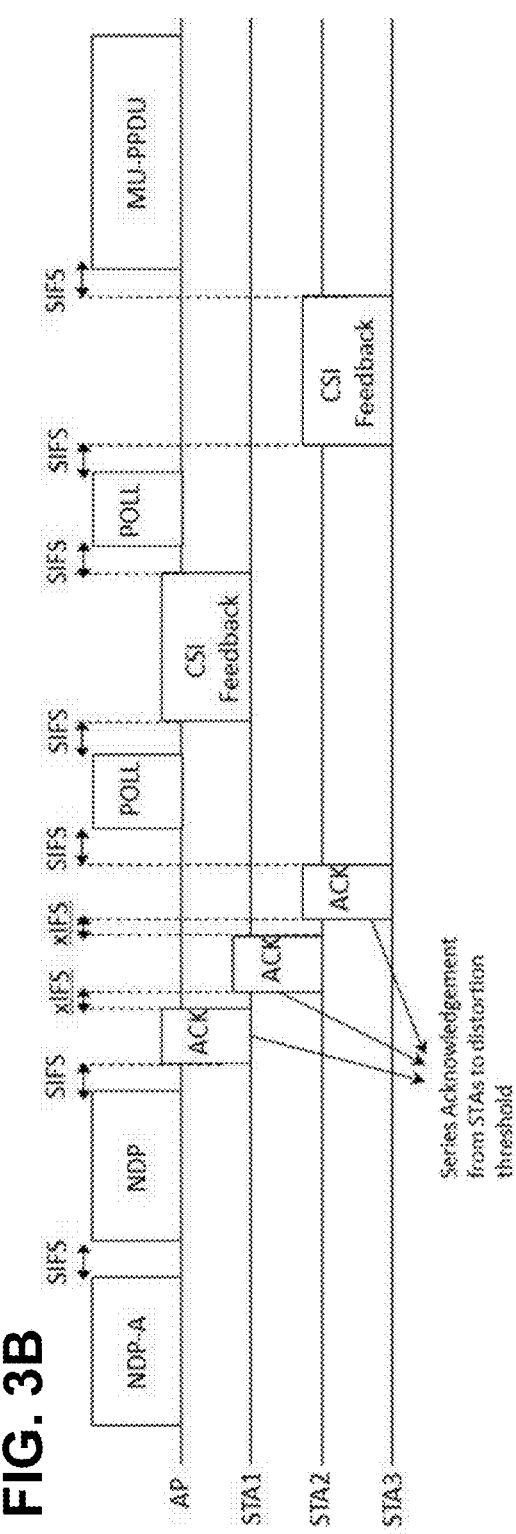

FIELDS IN THE NDP-A FRAME WITH ONE OCTET RESERVED FOR THE DISTORTION THRESHOLD

PLOT OF CHANNEL DISTORTION OVER TIME FOR DIFFERENT MOBILITY SCENARIOS

FLOWCHART DESCRIBING THE FEEDBACK PROCESS FOR STA

METHOD, APPARATUS, AND COMPUTER PROGRAM PRODUCT FOR WIRELESS SIGNALING

FIELD

The field of technology relates to wireless communication and more particularly to signaling mechanisms for wireless networks.

BACKGROUND

Modern society has adopted, and is becoming reliant upon, wireless communication devices for various purposes, such as connecting users of the wireless communication devices with other users. Wireless communication devices may vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

SUMMARY

Method, apparatus, and computer program product embodiments are disclosed for signaling mechanisms for wireless networks wherein wireless communications devices may perform a channel estimate transmission decision based on comparing current channel estimate to a previously sent channel estimate.

An example embodiment of the invention includes a method comprising:

transmitting, by an access node, a broadcast request message to one or more wireless terminal devices associated to a wireless network managed by the access node, to determine a distortion between a current channel estimate and the prior channel estimate and compare the determined distortion to a distortion threshold value included in the broadcast request message, the distortion threshold value being included in the broadcast request message or in another message generated by the access node;

receiving, by the access node from a subset of the one or more wireless terminal devices, one or more parallel or sequential acknowledgement messages indicating presence of the determined distortion greater than the distortion threshold value or indicating an inability to determine a distortion in channel estimates, only if the determined distortion is greater than the distortion threshold value or if there is an inability to determine a distortion in channel estimates; and transmitting, by the access node, one or more polling request messages, only to the subset of the one or more wireless terminal devices, to send the current channel estimate to the access node.

An example embodiment of the invention includes a method comprising:

wherein the broadcast request message is a null data packet announcement frame that includes the distortion threshold value set by the access node.

An example embodiment of the invention includes a method comprising:

wherein the one or more parallel acknowledgement messages, each include a short transmission pattern having a ZC-sequence identifying a sending one of the one or more wireless terminal devices.

An example embodiment of the invention includes a method comprising:

computing, by the access node, a ZC-sequence detection algorithm operating on the ZC-sequence received in each of the one or more parallel acknowledgement messages, to identify the one or more wireless terminal devices in the subset.

An example embodiment of the invention includes a method comprising:

wherein the one or more polling request messages comprises information indicating feedback request to different wireless terminal devices associated to the wireless network managed by the access node; and receiving by the access node, one or more messages from the one or more wireless terminal devices, in response to the one or more polling request messages, including the current channel estimate.

An example embodiment of the invention includes a method comprising:

computing, by the access node, a precoding matrix based on stored channel estimates and the current channel estimates in the one or more messages received from the one or more wireless terminal devices; and transmitting by the access node, one or more spatially multiplexed frames based on the computed precoding matrix, comprising data of one or more of the wireless terminal devices associated to the wireless network managed by the access node.

An example embodiment of the invention includes a method comprising:

storing, by a wireless device, a prior channel estimate that was previously transmitted to another wireless device in a wireless network;

receiving, by the wireless device, a request message from the other device, to determine a distortion between a current channel estimate and the prior channel estimate and compare the determined distortion to a distortion threshold value, the request message being a broadcast request message or a measurement request message and the distortion value being either included in the request message, received in another message, or a preconfigured value;

determining, by the wireless device, the distortion between the current channel estimate and the prior channel estimate and comparing the determined distortion to the distortion threshold value; and transmitting, by the wireless device, one or more parallel or sequential messages to the other device, indicating presence of the determined distortion greater than the distortion threshold value or indicating an inability to determine a distortion in channel estimates.

An example embodiment of the invention includes a method comprising:

wherein the wireless device is a wireless terminal device associated with the other device that is a wireless access node device;

wherein the wireless terminal device may transmit a current channel estimate to the access node if the determined distortion is greater than the distortion threshold value.

An example embodiment of the invention includes a method comprising:

wherein the wireless device is a wireless terminal device associated with the other device that is a wireless access node device;

wherein the one or more parallel messages, each include a short transmission pattern having a ZC-sequence identifying a sending one of the one or more wireless terminal devices.

An example embodiment of the invention includes a method comprising:

wherein the wireless device is a wireless terminal device associated with the other device that is a wireless access node device;

receiving one or more polling request messages comprising information indicating feedback request to different wireless terminal devices associated to the wireless network managed by the access node; and transmitting, by the wireless terminal device, one or more messages to the access node, in response to the one or more polling request messages, including the current channel estimate.

An example embodiment of the invention includes a method comprising:

receiving, by the wireless terminal, one or more spatially multiplexed frames based on a computed precoding matrix, comprising data of one or more of the wireless terminal devices associated to the wireless network managed by the access node, and applying spatial processing to decode its data.

An example embodiment of the invention includes an apparatus comprising:

at least one processor;

at least one memory including computer program code;

the at least one memory and the computer program code configured to, with the at least one processor, cause the apparatus at least to:

transmit a broadcast request message to one or more wireless terminal devices associated to a wireless network managed by the access node, to determine a distortion between a current channel estimate and the prior channel estimate and compare the determined distortion to a distortion threshold value included in the broadcast request message, wherein the distortion threshold value may be included in the broadcast request message or in another message generated by the access node;

receive from a subset of the one or more wireless terminal devices, one or more parallel or sequential acknowledgement messages indicating presence of the determined distortion greater than the distortion threshold value or indicating an inability to determine a distortion in channel estimates, only if the determined distortion is greater than the distortion threshold value or if there is an inability to determine a distortion in channel estimates; and transmit one or more polling request messages, only to the subset of the one or more wireless terminal devices, to send the current channel estimate to the access node.

An example embodiment of the invention includes an apparatus comprising:

wherein the broadcast request message is a null data packet announcement frame that includes the distortion threshold value set by the apparatus.

An example embodiment of the invention includes an apparatus comprising:

wherein the one or more parallel acknowledgement messages, each include a short transmission pattern having a ZC-sequence identifying a sending one of the one or more wireless terminal devices.

An example embodiment of the invention includes an apparatus comprising:

the at least one memory and the computer program code configured to, with the at least one processor, cause the apparatus at least to:

compute a ZC-sequence detection algorithm operating on the ZC-sequence received in each of the one or more parallel acknowledgement messages, to identify the one or more wireless terminal devices in the subset.

An example embodiment of the invention includes an apparatus comprising:

at least one processor;

at least one memory including computer program code;

the at least one memory and the computer program code configured to, with the at least one processor, cause the apparatus at least to:

store a prior channel estimate that was previously transmitted to another wireless device in a wireless network;

receive a request message from the other device, to determine a distortion between a current channel estimate and the prior channel estimate and compare the determined distortion to a distortion threshold value, the request message being a broadcast request message or a measurement request message and the distortion value being either included in the request message, received in another message, or a preconfigured value;

determine the distortion between the current channel estimate and the prior channel estimate and comparing the determined distortion to the distortion threshold value; and transmit one or more parallel or sequential messages to the other device, indicating presence of the determined distortion greater than the distortion threshold value or indicating an inability to determine a distortion in channel estimates.

An example embodiment of the invention includes an apparatus comprising:

wherein the wireless device is a wireless terminal device associated with the other device that is a wireless access node device;

wherein the broadcast request message is a null data packet announcement frame that includes the distortion threshold value set by the access node.

An example embodiment of the invention includes an apparatus comprising:

wherein the wireless device is a wireless terminal device associated with the other device that is a wireless access node device;

wherein the one or more parallel messages, each include a short transmission pattern having a ZC-sequence identifying a sending one of the one or more apparatus.

An example embodiment of the invention includes a computer program product comprising computer executable program code recorded on a computer readable, non-transitory storage medium, the computer executable program code comprising:

code for transmitting, by an access node, a broadcast request message to one or more wireless terminal devices associated to a wireless network managed by the access node, to determine a distortion between a current channel estimate and the prior channel estimate and compare the determined distortion to a distortion threshold value included in the broadcast request message, wherein the distortion threshold value may be included in the broadcast request message or in another message generated by the access node;

code for receiving, by the access node from a subset of the one or more wireless terminal devices, one or more parallel or sequential acknowledgement messages indicating presence of the determined distortion greater than the distortion threshold value or indicating an inability to determine a distortion in channel estimates, only if the determined distortion is greater than the distortion threshold value or if there is an inability to determine a distortion in channel estimates; and code for transmitting, by the access node, one or more polling request messages, only to the subset of the one or more wireless terminal devices, to send the current channel estimate to the access node.

An example embodiment of the invention includes a computer program product comprising computer executable program code recorded on a computer readable, non-transitory storage medium, the computer executable program code comprising:

code for storing, by a wireless device, a prior channel estimate that was previously transmitted to another wireless device in a wireless network;

code for receiving, by the wireless device, a request message from the other device, to determine a distortion between a current channel estimate and the prior channel estimate and compare the determined distortion to a distortion threshold value, the request message being a broadcast request message or a measurement request message and the distortion value being either included in the request message, received in another message, or a preconfigured value;

code for determining, by the wireless device, the distortion between the current channel estimate and the prior channel estimate and comparing the determined distortion to the distortion threshold value; and code for transmitting, by the wireless device, one or more parallel or sequential messages to the other device, indicating presence of the determined distortion greater than the distortion threshold value or indicating an inability to determine a distortion in channel estimates.

The resulting example embodiments provide signaling mechanisms for signaling mechanisms for wireless networks.

DESCRIPTION OF THE FIGURES

FIG. 2B is an example flow diagram of operational steps in a wireless terminal device, according to an example embodiment of the invention.

FIG. 3A is an example illustration of the signaling for spatial multiplexing with parallel acknowledgements by stations (STAs), according to an example embodiment of the invention.

FIG. 3B is an example illustration of the signaling for spatial multiplexing with series acknowledgements by STAs, according to an example embodiment of the invention. The x-inter frame spacing (xIFS) may be the SIFS, RIFS or any other inter-frame spacing as specified in the IEEE 802.11 standards.

DISCUSSION OF EXAMPLE EMBODIMENTS OF THE INVENTION

Figure 1A:
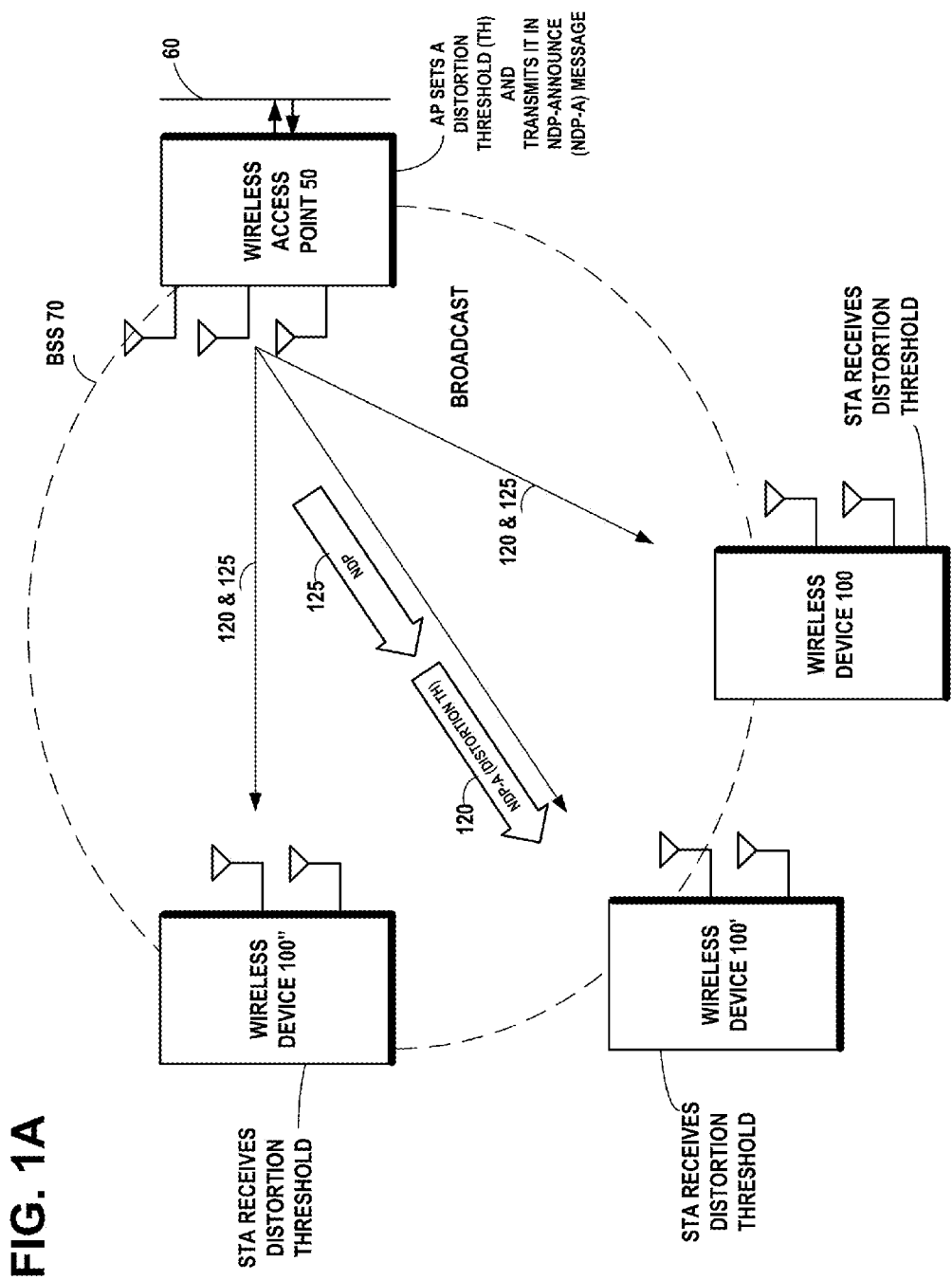
FIG. 1A illustrates an example network diagram of an access point broadcasting a null data packet announcement frame that includes a distortion threshold value set by the access point. The null data packet announcement frame is shown being transmitted to three groups of wireless terminal devices associated to the wireless network managed by the access point. The null data packet announcement frame (NDP-A) is a broadcast request message to the wireless terminal devices to determine a distortion between a current channel estimate and the prior channel estimate and to compare the determined distortion to the distortion threshold value included in the broadcast message, and where the current channel is estimated from the null data packet (NDP) transmitted by the access node. The wireless terminal devices have previously stored a prior channel estimate that was previously transmitted to the access point, according to an example embodiment of the invention.

This section is organized into the following topics:
A. WLAN Communication Technology
B. Wireless Signaling
A. WLAN Communication Technology The IEEE 802.11 standard specifies methods and techniques of an exemplary wireless local area network (WLAN) operation. Examples include the IEEE 802.11a, 802.11b, 802.11g and 802.11n wireless local area network specifications, which have been a staple technology for traditional WLAN applications in the 2.4 GHz and 5 GHz ISM bands. The various amendments to the IEEE 802.11 standard were consolidated for IEEE 802.11a, b, d, e, g, h, i, j, k, n, r, s, u, v, and z protocols, into the base standard *IEEE 802.11-2012, Wireless Medium Access Control (MAC) and Physical Layer (PHY) Specifications*, February 2012. Applications of these IEEE 802.11 standards include products such as consumer electronics, telephones, personal computers, and access points for both for home and office.

According to an example embodiment, an IEEE 802.11 WLAN may be organized as an independent basic service set (IBSS) or an infrastructure basic service set (BSS). The access point (AP) 50 in an infrastructure basic service set (BSS) IEEE 802.11 WLAN network 70, may be a central hub that relays all communication between the mobile wireless devices (STAs) 100 in an infrastructure BSS. In an infrastructure BSS, the AP may transmit beacons or respond to probes received from STAs. After a possible authentication of a STA that may be conducted by the AP, an association may occur between the AP and a STA enabling data traffic to be exchanged with the AP. The Access Point (AP) in an Infrastructure BSS may bridge traffic out of the BSS onto a distribution network. STAs that are members of the BSS may exchange packets with the AP. In what follows, an AP may be referred to as a base station, an access node, a wireless device, a wireless node, a sender or a receiver depending on the context. Similarly, an STA may be referred to as a wireless terminal device, a wireless client, a wireless node, a mobile user, a mobile station, a wireless device, a sender or a receiver depending on the context. Furthermore, a wireless signal transmitted may be referred to as a packet, a frame, a message or some other suitable terminology. Similarly, a frame of the radio layer 128-128", of the MAC layer 142-142", and of the Network layer 144-144" may be referred to as a packet, a frame or some other suitable terminology.

According to an example embodiment, the IEEE 802.11 WLAN may use two types of transmission: Distributed Coordination Function (DCF) and Point Coordination Function (PCF). To avoid collision with an ongoing packet transmission, DCF employs Carrier Sense Multiple Access with Collision Avoidance (CSMA/CA) where an STA or AP waits for the wireless medium to go idle before transmitting its packet; and a packet once sent may be positively acknowledged by the receiver through the Acknowledgement (ACK) frame. The carrier sensing in CSMA/CA may be done either physically through spectrum sensing, or virtually through token reservations. In virtual carrier sensing, a transmission may begin with a Request to Send (RTS) frame and the receiver may respond with a Clear to Send (CTS) frame. The channel may be cleared by these two messages, since all STAs that hear at least one of the RTS or CTS may suppress their own start of a transmission. The Request to Send (RTS) packet sent by the sender and the Clear to Send (CTS) packet sent in reply by the intended receiver may alert all other devices within range of the sender and the receiver respectively, to refrain from transmitting for the duration of the main packet. When data packets are transmitted, there may be a Network Allocation Vector (NAV) containing a duration value to reserve the channel for the sender and receiver for an interval equal to the NAV duration. The network allocation vector (NAV) is an indicator that may be maintained by each STA, of time periods when transmission onto the wireless medium will not be initiated by the STA whether or not the STA's physical carrier sensing function senses that the medium may be busy. STAs receiving a valid frame may update their NAV with the information received in the duration field for all frames where the new duration value is greater than the current NAV value, including the RTS and CTS packets, as well as data packets. The value of the NAV unless reset is decremented with each time slot. Once the sender and receiver have reserved the channel, they may hold it for the remaining duration of the NAV value. The last acknowledgement packet (ACK) contains a duration value of zero, to release the channel.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), the shortest of the interframe spaces, may allow acknowledgement (ACK) frames and RTS-CTS frames to have access to the medium before others. The longer duration distributed coordination function (DCF) interframe space or DIFS interval may be used for transmitting data frames and management frames. Example values of DIFS and SIFS for IEEE 802.11n specification are 28/50/34 microseconds and 10/16 microseconds, respectively.

According to an example embodiment, after the channel has been released, IEEE 802.11 wireless devices normally employ a spectrum sensing capability during the DIFS interval, to detect whether the channel may be busy. A physical carrier sensing scheme may be used wherein a node wishing to transmit data has to first listen to the channel for a predetermined amount of time to determine whether or not another node may be transmitting on the channel within the wireless range. If the channel is sensed to be idle, then the node may be permitted to begin the transmission process. If the channel is sensed to be busy, then the node may delay its transmission for a random period of time called the backoff interval, which is specified in terms of number of timeslots, where a timeslot according to IEEE 802.11n is 9 or 20 microseconds long. In the DCF protocol used in IEEE 802.11 networks, the wireless nodes, on sensing a channel idle for DIFS interval, may enter the backoff phase with a random value between 0 and CWmin. The backoff counter may be decremented from this selected value as long as the channel is sensed idle.

According to an example embodiment, an algorithm, such as binary exponential backoff, may be used to randomly delay transmissions, in order to avoid collisions. The transmission may be delayed by an amount of time that is the product of the slot time and a pseudo random number. Initially, each sender may randomly wait 0 or 1 slot times. After a busy channel is detected, the senders may randomly wait between from 0 to 3 slot times. After the channel is detected to be busy a second time, the senders may randomly wait between from 0 to 7 slot times, and so forth. As the number of transmission attempts increases, the number of random possibilities for delay increases exponentially. An alternate backoff algorithm may be the truncated binary exponential backoff, wherein after a certain number of increases, the backoff counter reaches a ceiling, CWmax, and thereafter does not increase any further. Specifically, the backoff counter is frozen for the timeslot when the wireless node detects a busy medium during the backoff phase, and is doubled on an unsuccessful transmission.

According to an example embodiment, it may also be possible to start data transmission directly without RTS-CTS signaling and in that case, the maximum packet size is set by the RTS Threshold. Additionally, a sender may use the CTS-to-self mechanism where it sends only a CTS frame to clear the medium before data transmission.

According to an example embodiment, the BSS network 70 may employ the IEEE 802.11e standard that provides for Enhanced Distributed Coordination Access (EDCA). The traffic at a wireless node—voice, video, best effort and background—may be grouped into access category (ACs), and each AC may have its own contention parameters: CWmin and CWmax. The ACs may be implemented as separate queues in the MAC layer 142 of a wireless node. This may achieve quality-of-service (QoS) differentiation by sending packets of high priority AC, for e.g. VoIP, with a higher probability. EDCA specifies the arbitration interframe space (AIFS) interval to replace the DIFS interval used for carrier sensing, and higher priority ACs may use shorter AIFS during medium access. In addition, EDCA introduces a contention-free period called transmit opportunity (TXOP) for each AC, during which the wireless node may transmit a single frame or a burst of back-to-back frames of the AC within the defined maximum duration of the TXOP. The above described EDCA access parameters may be obtained by station 100 from the Beacon frame or the probe responses of the AP 50.

According to an example embodiment, following the dot11FragmentationThreshold attribute, a packet received at the MAC layer 142" from the Network layer 144", known as the MAC service data unit (MSDU), may be fragmented into multiple smaller MAC protocol data units (MPDUs). The MPDU carries the MAC header to identify the sender and the receiver MAC address, and CRC information to detect packet errors. It is prepended with a PLCP preamble and a PLCP header to form a PHY layer protocol data unit (PPDU), where the PLCP stands for Physical Layer Convergence Protocol. The PPDU may then be sent by the radio 128" of the wireless node 50 during its TXOP, where the TXOP corresponds to the Access Category (AC) of the MSDU. The PLCP preamble is used by the radio 128 of the receiver node 100 to do packet detection; frequency offset correction; and timing estimation. Subsequently, the receiver obtains the contents of the MPDU by decoding the packet, and through defragmentation receives the MSDU frame at its MAC layer 142. It is therefore to be noted that throughout the document, the term data frame may refer to a MPDU or PPDU depending on the context.

According to an example embodiment, a block acknowledgement protocol may be used, by setting the Ack policy field to Block Ack, which allows multiple data frames to be acknowledged with a single Block Acknowledgement (BA) frame. The sender of the data frames may send a Block Block Acknowledgement request (BAR) frame to elicit BA from the receiver, or may use the implicit BAR mechanism.

According to an example embodiment, the BSS network 70 may use the high throughput (HT) MAC layer and other enhancements specified in IEEE 802.11n, and may also use the very high throughput (VHT) MAC layer and other enhancements specified in the IEEE 802.11ac standard. Aggregation at the MAC layer may be used to collect and encapsulate multiple MSDUs (A-MSDU) into a single MPDU packet. In addition, multiple MPDUs may be encapsulated into a single A-MPDU frame that otherwise replaces a single MPDU transmitted at a time.

The radios 128-128" implement the physical (PHY) layer functionality of the wireless nodes. At a receiver node, the radio 128 implements the RF and baseband receive chain, demodulation and decoding operations, and the radio 128" of a sender node implements RF and baseband transmit chain, modulation and coding operations. In one example, the radios implement the orthogonal frequency-division multiplexing (OFDM) technology to encode the modulated symbols into multiple subcarrier frequencies. With OFDM, the PHY layer processing like modulation, demodulation, channel estimation etc. may be done on a subcarrier basis.

Each packet received by the PHY layer from the MAC layer, whether control or a data frame, is represented as a sequence of 0-1 bits. The PHY layer first applies channel coding on the packet to introduce redundancy and improve resilience to packet errors. This may be done with LDPC codes or with convolutional coding, and may be combined with scrambling and interleaving operation. The enlarged bit stream is then mapped to a stream of symbols through a modulation scheme, for example BPSK, 64-QAM or 256-QAM. The series stream of symbols is converted into parallel low-rate streams and loaded onto the OFDM subcarriers, and an inverse-fourier transform (IFFT) is applied to these subcarriers to generate the time domain baseband waveform. The RF signal that is fed to the antenna and ultimately transmitted on the air is generated through up-conversion of the baseband signal. For a receive node, the signal received at its antenna is processed by the PHY layer to generate the MAC packet. The processing is exactly reverse of that for a sender node as described above.

According to an example embodiment, the AP and the STAs in the network support multiple antenna or MIMO technology as introduced in WLAN standards 802.11n and beyond. By way of example, the BSS network 70 shows the AP 50 with three antennas and STAs 100, 100', 100" with two antennas each. These antennas connected to the radio may have a common or a separate RF chain, and may operate on different frequencies, and may not all be active at the same time. However, this invention may be applicable to any number and to any configuration of antennas at AP and STAs, and by no means limited to the number of antennas shown or the scenarios described here.

In particular, the AP and STAs in the BSS network 70 support transmissions of multiple STAs using spatial multiplexing, also known as Multi-user beamforming or MU-MIMO. An AP with multiple antennas typically uses Transmit-Beamforming (Tx-BF) to produce a powerful beam at a single STA. The beam carries one or more data streams depending on the number of receive antennas at the STA. The AP may also create beams to multiple STAs with each beam carrying the intended streams for an STA. This technique is otherwise known as MU-MIMO. While Tx-BF improves throughput performance of a single STA in low SNR conditions, MU-MIMO achieves higher capacity gains by serving multiple STAs together. The STA beams in MU-MIMO are generated through linear precoding techniques like Zero-Forcing and Block-Diagonalization. In this, each antenna transmits a weighted sum of the STAs' data symbols, and the antenna weights are generated based on the channel state between the AP and the STAs. All STAs participating in MU-MIMO are therefore required to exchange the channel state information (CSI) with the AP to compute the precoding matrix, which is a matrix consisting of the weights applied to the antennas. In what follows, this CSI may also be also referred to as the channel estimate, the channel feedback, or with some other suitable terminology; and the process may be referred to as the channel feedback, or as channel feedback process or simply as the feedback process.

The wireless channel seen by the antennas of STA i, i=1, 2, 3 . . . , with respect to the antennas of the AP is expressed through a baseband channel matrix $H\_(i,n)$ where n is the subcarrier index and takes values $n=1, \ldots, N\_c$. Here, $N\_c$ is the number of subcarriers in OFDM, for example, $N\_c=128$ for a 40 MHz wide channel. For $N\_i$ number of receive antennas at the STA i and $N\_t$ number of transmit antennas at the AP, the channel matrix $H\_(i,n)$ is a $N\_i \times N\_t$ dimensional complex valued matrix. Using singular value decomposition (SVD), the channel may also be expressed as $H\_(i,n)=U\_(i,n) \Lambda\_(i,n) V\_(i,n)$, where $U\_(i,n)$ and $V\_(i,n)$ are the left and the right singular matrix respectively, and $\Lambda\_(i,n)$ is a diagonal matrix of singular values. In one example, depending on the precoding technique used, a STA i may be required to send one among the four types of channel feedback for each subcarrier: 1) Full CSI feedback i.e. $H\_(i,n)$; 2) Compressed CSI feedback i.e. $(H\_(i,n))\hat{}$; 3) Non-compressed beamforming weights feedback i.e. $V\_(i,n)$; and 4) Compressed beamforming weights feedback i.e. $(V\_(i,n))\hat{}$. Here, ($\hat{}$) represents the operation of compression, for e.g. quantization.

B. Wireless Signaling

In accordance with an example embodiment of the invention, a wireless communications device may perform a channel estimate transmission decision based on comparing current a channel estimate to previously sent channel estimate. The wireless device may store a prior channel estimate that was previously transmitted to another wireless device in a wireless network. The wireless device may receive a request message from the other device, to determine a distortion between a current channel estimate and the prior channel estimate and compare the determined distortion to a distortion threshold value. The request message may be a broadcast request message or a measurement request message. The distortion value may be included in the request message, received in another message, or be a preconfigured value. The wireless device may determine the distortion between the current channel estimate and the prior channel estimate and compare the determined distortion to the distortion threshold value. If the determined distortion is greater than the distortion threshold value or if there is an inability to determine a distortion in channel estimates, then the wireless device may transmit one or more parallel or sequential messages to the other device, indicating the presence of the determined distortion greater than the distortion threshold value or indicating an inability to determine a distortion in channel estimates.

In an example embodiment of the invention, a wireless access point may transmit a broadcast request message to one or more wireless terminal devices associated to a wireless network managed by the access point. The request may be to determine a distortion between a current channel estimate and the prior channel estimate and compare the determined distortion to a distortion threshold value. The distortion value may be included in the broadcast request message or in another message generated by the access point. The access point may receive from a subset of the one or more wireless terminal devices, one or more parallel or sequential acknowledgement messages indicating the presence of the determined distortion greater than the distortion threshold value or indicating an inability to determine a distortion in channel estimates. In an example embodiment of the invention, an acknowledgement may be received only if the determined distortion is greater than the distortion threshold value or if there is an inability to determine a distortion in channel estimates. In an example embodiment of the invention, the access point may transmit one or more polling request messages, only to the subset of the one or more wireless terminal devices, to send the current channel estimate to the access point.

There are many possible networks wherein example embodiments of the invention may apply. One such example may be the IEEE 802.11ac wireless standard, which introduced support for multiple antennas at access points and STA devices. The IEEE 802.11ac wireless standard specifies advanced signal processing techniques such as Multiuser Beamforming (also called MU-MIMO) to allow concurrent transmissions to multiple users.

In accordance with an example embodiment of the invention, to support MU-MIMO transmissions, a signaling method for channel feedback is provided between STAs and AP by relating channel estimate to the channel feedback. The proposed mechanism reduces the feedback delay by avoiding unnecessary feedback from STAs which observe relatively stable channels.

According to an example embodiment, the AP in BSS network 70 serves multiple STAs by multiplexing all the STAs data symbols into a single frame, but separating them in the spatial domain so that each STA is still able to decode its data. This may be achieved with precoding at the AP using the downlink (DL) channel information between the STAs and the AP, and sending a single multi-user PPDU(MU-PPDU) carrying together all the A-MPDU's of the STAs. The medium access in this case is done through a MU-TXOP of the AP. The measurement of DL channel of each STA by the AP may be done via two methods: 1) explicit feedback—using dedicated broadcast frames like null data packet (NDP) to measure the channel, and requesting the measurements to be fed back from the STAs; 2) implicit feedback—measuring the uplink (UL) channel of STAs from their UL frames, and exploiting channel reciprocity to approximate it as the DL channel estimate.

According to an example embodiment, the feedback sequence of IEEE 802.11ac may be used to facilitate explicit CSI feedback from STAs. It begins with broadcast of a null data packet announcement (NDP-A) frame by the AP that contains the STA Info fields. These fields carry information to identify the STAs that participate in the MU-MIMO transmission. A null data packet (NDP) frame is then transmitted by the AP after a lapse of SIFS time period. The NDP frame has no data fields and is indicated by setting the Not-Sounding field in the HT-SIG information to 0. It contains the HT-long training field (HT-LTF) that is used by each participating STA i to estimate its channel $H\_(i,n)$ for each subcarrier. In another example, a normal data packet in place of the NDP may be used for sounding by setting the Not-Sounding field in the HT-SIG information to 0. In this case, the number of HT-LTFs otherwise used for data transmission may be increased to match the dimensionality of the channel.

After the AP transmits a NDP frame, it polls sequentially each STA to request channel feedback. The polling order may be set according to the STA order in the Group ID table as specified in the 802.11ac standard. When a STA receives a feedback poll frame from the AP carrying its address in the receive address (RA) field, it sends a feedback frame according to the one of the four types of feedback response desired, after a delay of SIFS period. The feedback information of a STA, for e.g. $H\_(i,n)$, contains complex valued numbers. A quantization operation is applied to represent this information as data bits. A fixed-length or a variable-length quantization scheme may be used. In one example, other compressions schemes like Givens rotation, Gaussian elimination etc. may be used for the Beamforming weight matrix $V\_(i,n)$, or for the Channel matrix $H\_(i,n)$. These feedback data bits are then transmitted by the STA to the AP like any other data packet.

The null data packet announce (NDP-A), NDP, poll and the feedback frames together constitute the MU-MIMO feedback sequence. In one example, the feedback sequence may be initiated by the AP within a TXOP of any one of its AC, and may include transmissions from one or more of the ACs. In another example, the inter-frame spacing interval during the feedback process may be set to AIFS, RIFS or any other interval specified.

In one aspect, the feedback poll frames from the AP are not required, and the order of feedback from STAs may be set through a schedule field in the NDP-A frame, or implicitly from the Group ID table or any other broadcast frame.

The above described mechanism for channel feedback suffers from some drawbacks, for it may reduce airtime in the TXOP available for data transmission especially when the number of stations is increased. A long value of feedback delay may also lead to a situation where estimated channel of one or more of the STAs is significantly different from what is observed during data transmission, thus resulting in residual interference at STAs from MU-MIMO precoding.

In an example deployment of network 70 and other deployments, the channel of each STA may change with a different rate depending on its mobility, channel fading, obstructions etc. For example, the channel variation may be much less for stationary STAs when compared to the mobile STAs. Therefore, channel feedback from only those participating STAs whose channel has changed significantly across the past measurement and the current estimate may be needed. While this reduces the feedback overhead for spatial multiplexing by engaging a subset of STAs, it is not known how to choose this subset of STAs.

In accordance with an example embodiment of the invention, a distortion measure of the estimated channel matrix may be used to select the set of STAs that is polled during the feedback process. Here, the distortion is defined as the relative change of the current estimated channel state from the estimated channel state that is most recently fed back to the AP. The AP sets a distortion threshold that it broadcasts in NDP-A; STAs that observe a channel distortion above this threshold or are unable to compute the channel distortion are requested to send channel feedback. Once the threshold is set, the AP needs to identify STAs that qualify to participate in the feedback process. The straightforward way of polling all STAs to get their distortion values may be inefficient especially when the number of such STAs becomes large.

In accordance with an example embodiment of the invention, a signaling method for MU-MIMO feedback via ZC-sequence may be based on parallel acknowledgements. Each STA is identified by a unique ZC-sequence assigned by the AP. The STAs that qualify for the feedback process transmit their individual sequences simultaneously following a broadcast of NDP by the AP. The AP runs a ZC-sequence detection algorithm to identify the qualified STAs, which the AP then polls sequentially to obtain the feedback.

In another example embodiment of the invention, all STAs may send series acknowledgement frames in response to the NDP in orthogonal time slots. If the short acknowledgement frame also carries the individual channel distortion values, the AP may do a selective feedback based on these values. To keep the overhead small, the inter frame spacing between the series acknowledgement frames may be shorter than the standard SIFS period.

In another example embodiment of the invention, a STA may use the block acknowledgement frame to indicate if its distortion exceeds the distortion threshold set by the AP. A STA may also use the BA frame to convey the channel distortion it observes. From this, the AP may identify the set of STAs that qualify for feedback. The AP then polls or schedules those STAs for feedback within the same or a different MU-TXOP.

For a STA that the AP does not poll for feedback but is included in the MU-MIMO transmission, the AP uses the most recent channel feedback from that STA stored in its channel memory.

FIG. 1A illustrates an example network diagram of an access point 50 broadcasting a null data packet announcement frame 120 that includes a distortion threshold value TH set by the access point 50. The null data packet announcement frame 120 is shown being transmitted, along with an NDP packet, to three wireless terminal devices 100, 100', and 100", that participate in the MU-MIMO transmission, and are associated to the wireless network 70 managed by the access point 50. The null data packet announcement frame 120 is a request message to the wireless terminal devices to determine a distortion between a current channel estimate and the prior channel estimate and to compare the determined distortion to the distortion threshold value TH included in the broadcast null data packet announcement frame 120. The wireless terminal devices 100, etc. have previously stored a prior channel estimate that was previously transmitted to the access point 50, according to an example embodiment of the invention.

Figure 1B:
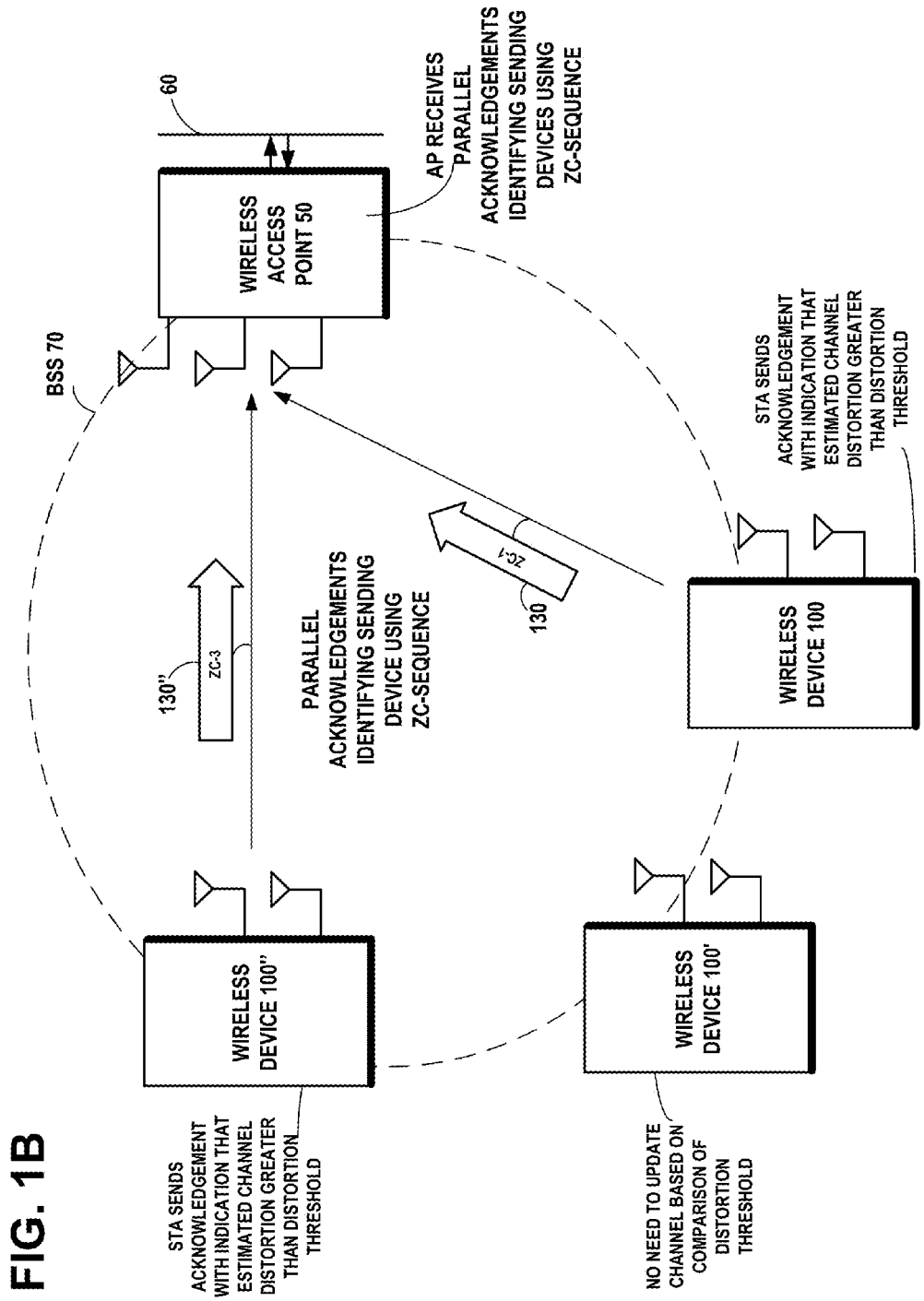
FIG. 1B illustrates the example network diagram of FIG. 1A, wherein the wireless terminal devices have received the broadcast request message from the access point. The wireless terminal devices determine the distortion between their current channel estimate and their prior channel estimate and compare the determined distortion to the distortion threshold value included in the broadcast request message. The wireless terminal devices transmit one or more parallel acknowledgement messages indicating presence of a determined distortion greater than the distortion threshold value or indicating an inability to determine a distortion in channel estimates. The one or more parallel acknowledgement messages, each include a short transmission pattern having a ZC-sequence identifying the sending one of the one or more wireless terminal devices. The wireless terminal devices transmit one or more parallel acknowledgement messages, only if the determined distortion is greater than the distortion threshold value or if there is an inability to determine a distortion in channel estimates. The access point receives from a subset of the one or more wireless terminal devices, the one or more parallel acknowledgement messages, only from those wireless terminal devices that have indicated a presence of the determined distortion greater than the distortion threshold value or indicated an inability to determine a distortion in channel estimates, according to an example embodiment of the invention.

FIG. 1B illustrates the example network diagram of FIG. 1A, wherein the wireless terminal devices 100, etc. have received the broadcast null data packet announcement frame 120 from the access point 50. The wireless terminal devices 100, etc. determine the distortion between their current channel estimate and their prior channel estimate and compare the determined distortion to the distortion threshold value TH included in the broadcast null data packet announcement frame 120. The wireless terminal devices 100, 100" transmit parallel acknowledgement messages 130, 130" indicating presence of a determined distortion greater than the distortion threshold value TH or indicating an inability to determine a distortion in channel estimates. The one or more parallel acknowledgement messages 130, 130", each include a short transmission pattern having a Zadoff-Chu (ZC)-sequence ZC-1, ZC-3 identifying the sending of 100, 100" among the one or more wireless terminal devices 100, etc. The access point 50 receives from a subset of the one or more wireless terminal devices 100, etc., the parallel acknowledgement messages 130, 130", only from those wireless terminal devices 100, etc. that have indicated a presence of the determined distortion greater than the distortion threshold value TH or indicated an inability to determine a distortion in channel estimates, according to an example embodiment of the invention.

Figure 1C:
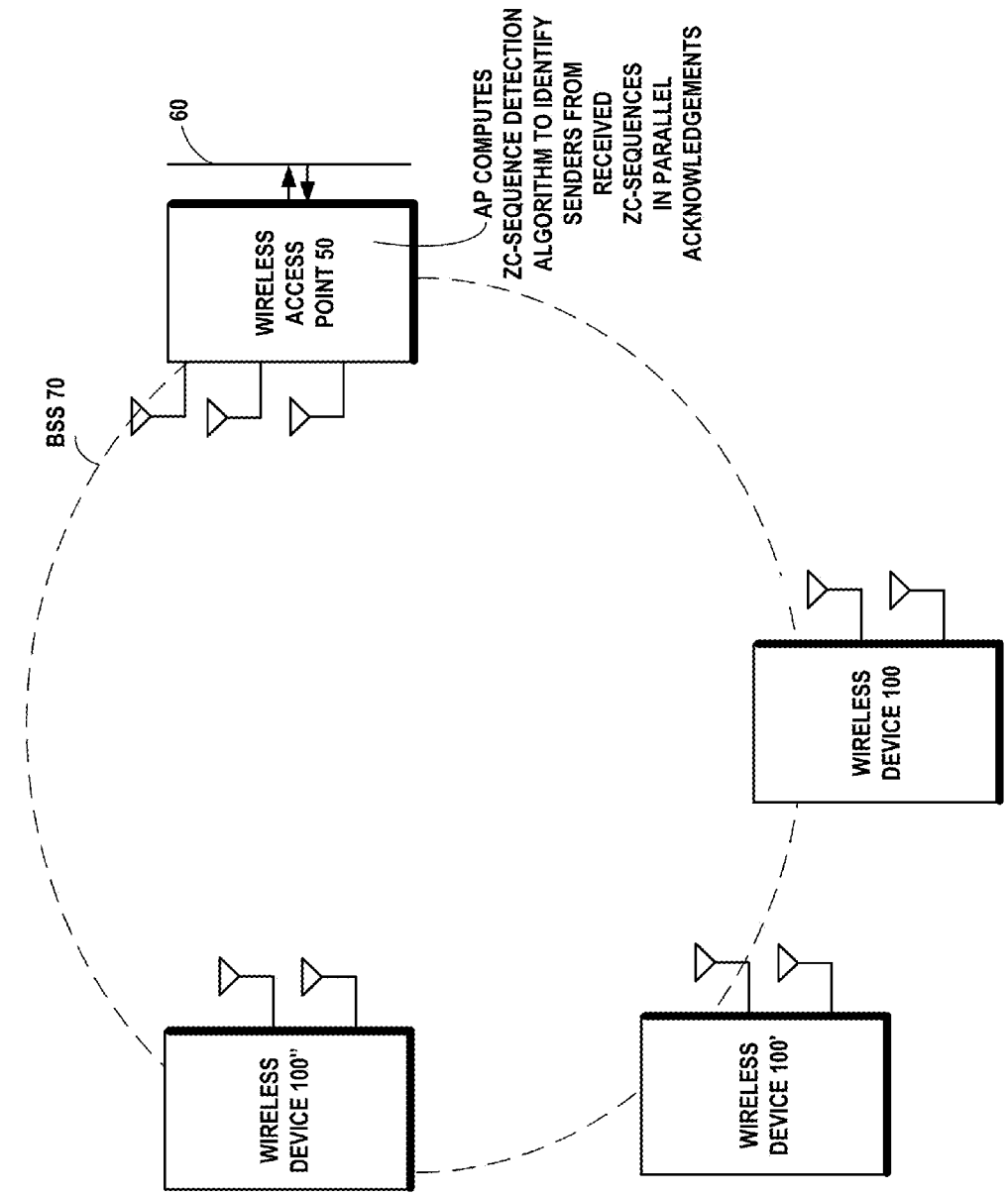
FIG. 1C illustrates the example network diagram of FIG. 1B, wherein the access point computes a ZC-sequence detection algorithm operating on the ZC-sequence received in each of the one or more parallel acknowledgement messages, to identify the one or more wireless terminal devices in the subset, according to an example embodiment of the invention.

FIG. 1C illustrates the example network diagram of FIG. 1B, wherein the access point 50 computes a ZC-sequence detection algorithm operating on the ZC-sequence received in each of the one or more parallel acknowledgement messages 130, 130", to identify the one or more wireless terminal devices 100, etc. that qualify for feedback, according to an example embodiment of the invention.

Figure 1D:
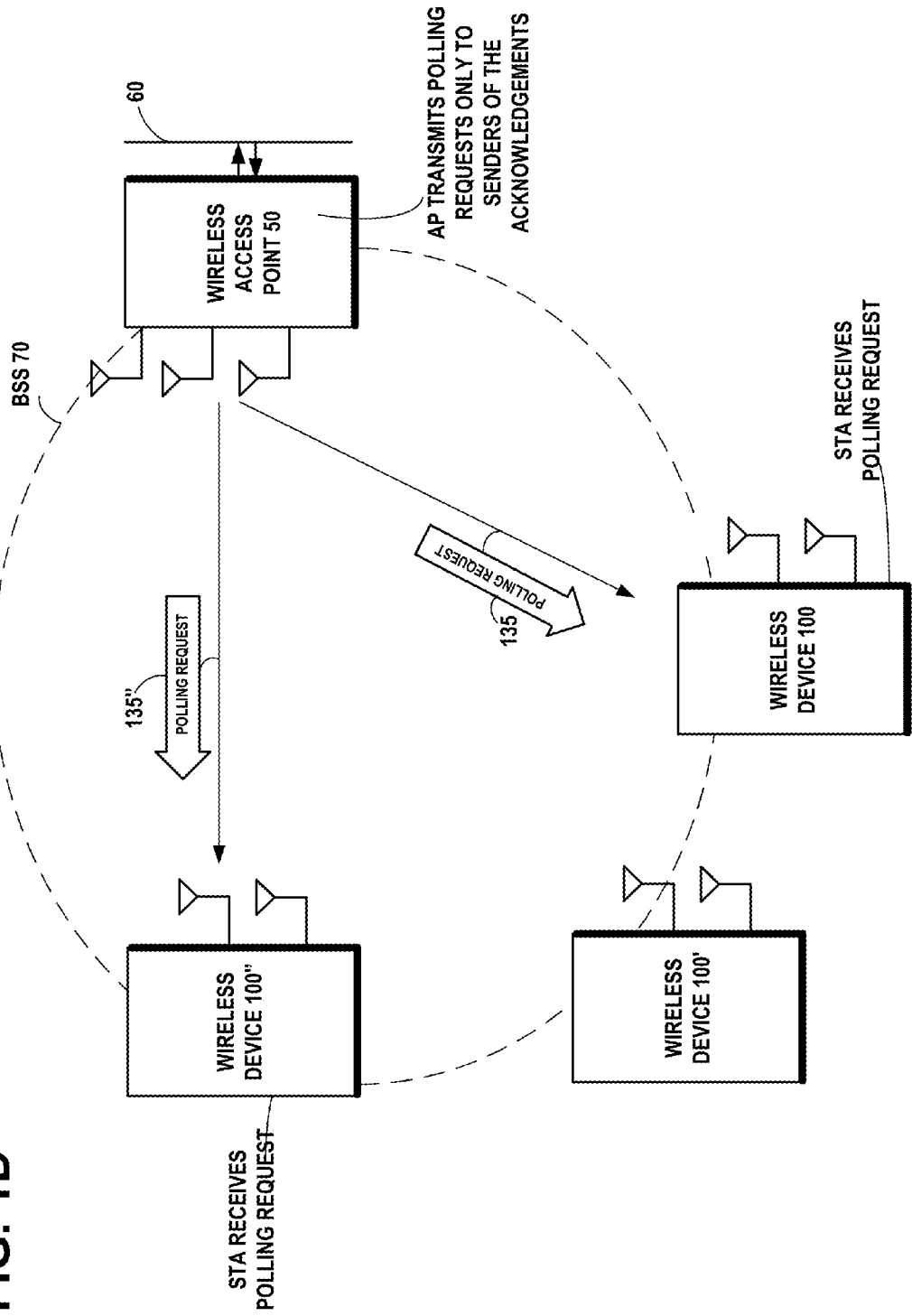
FIG. 1D illustrates the example network diagram of FIG. 1C, wherein the access point transmits one or more polling request messages, only to the subset of the one or more wireless terminal devices, to send the current channel estimate to the access point. The one or more polling request messages may comprises information indicating feedback response from the wireless terminals.

FIG. 1D illustrates the example network diagram of FIG. 1C, wherein the access point 50 transmits polling request messages 135, 135", only to the qualified wireless terminal devices 100, 100", to send the current channel estimate to the access point 50. The polling request messages 135, 135" may comprise information indicating feedback request from wireless terminal 100 and 100", respectively.

Figure 1E:
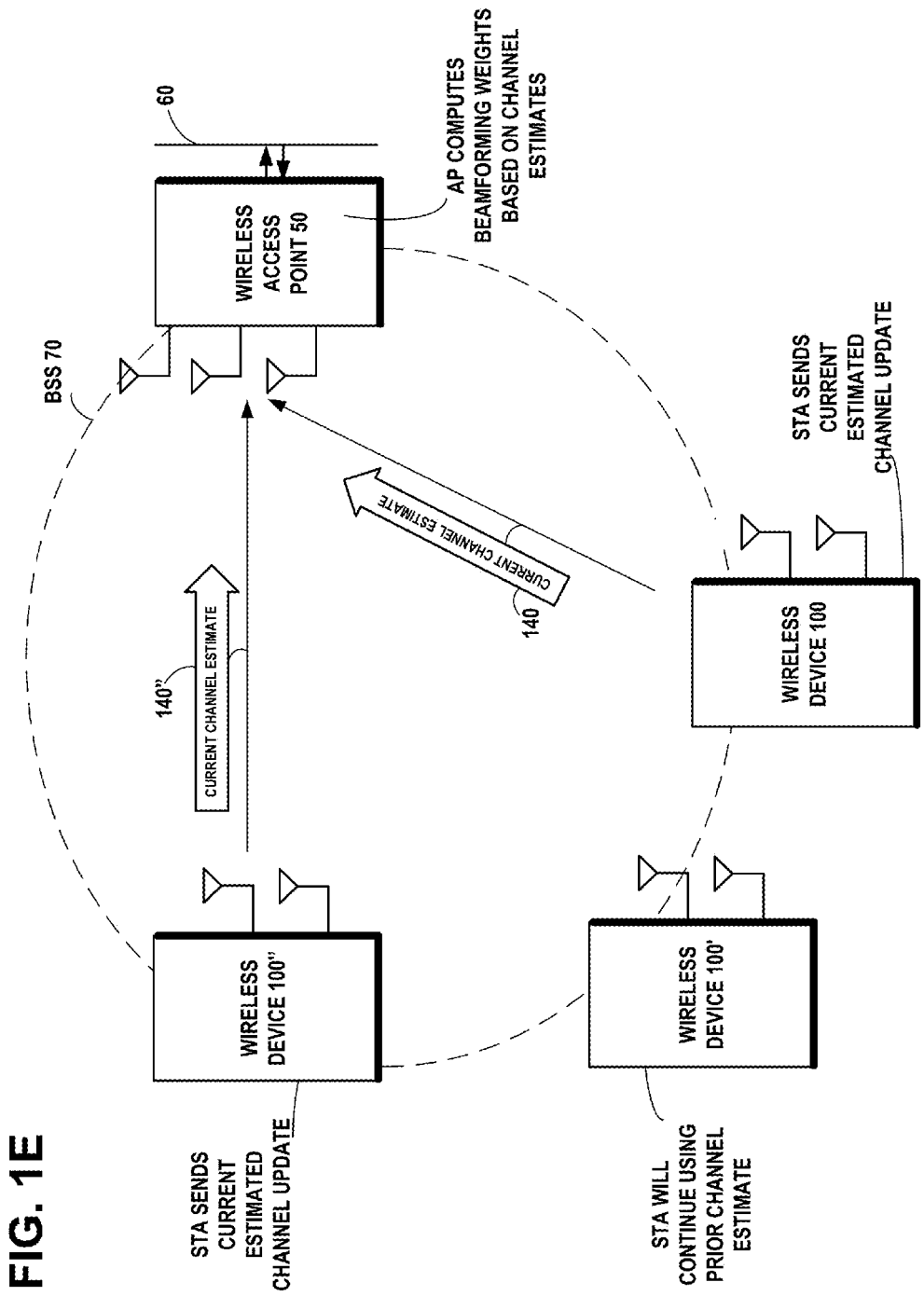
FIG. 1E illustrates the example network diagram of FIG. 1D, wherein the wireless terminal devices transmit one or more messages to the access point, in response to the poll frames of the AP. The messages include the current channel estimate determined by the respective wireless terminal device. The access point computes the precoding matrix based on the stored channel estimates and the current channel estimates in the one or more messages received from the one or more wireless terminal devices, according to an example embodiment of the invention.

FIG. 1E illustrates the example network diagram of FIG. 1D, wherein the wireless terminal devices 100, 100" transmit messages 140, 140" to the access point 50, in response to the poll frames from the AP. The messages 140, 140" include the current channel estimate or the feedback determined by the respective wireless terminal device 100, 100". The access point 50 computes precoding matrix based on the stored channel estimate of STA 100' and the current channel estimates of STA 100, 100" from messages 140, 140", according to an example embodiment of the invention.

Figure 1F:
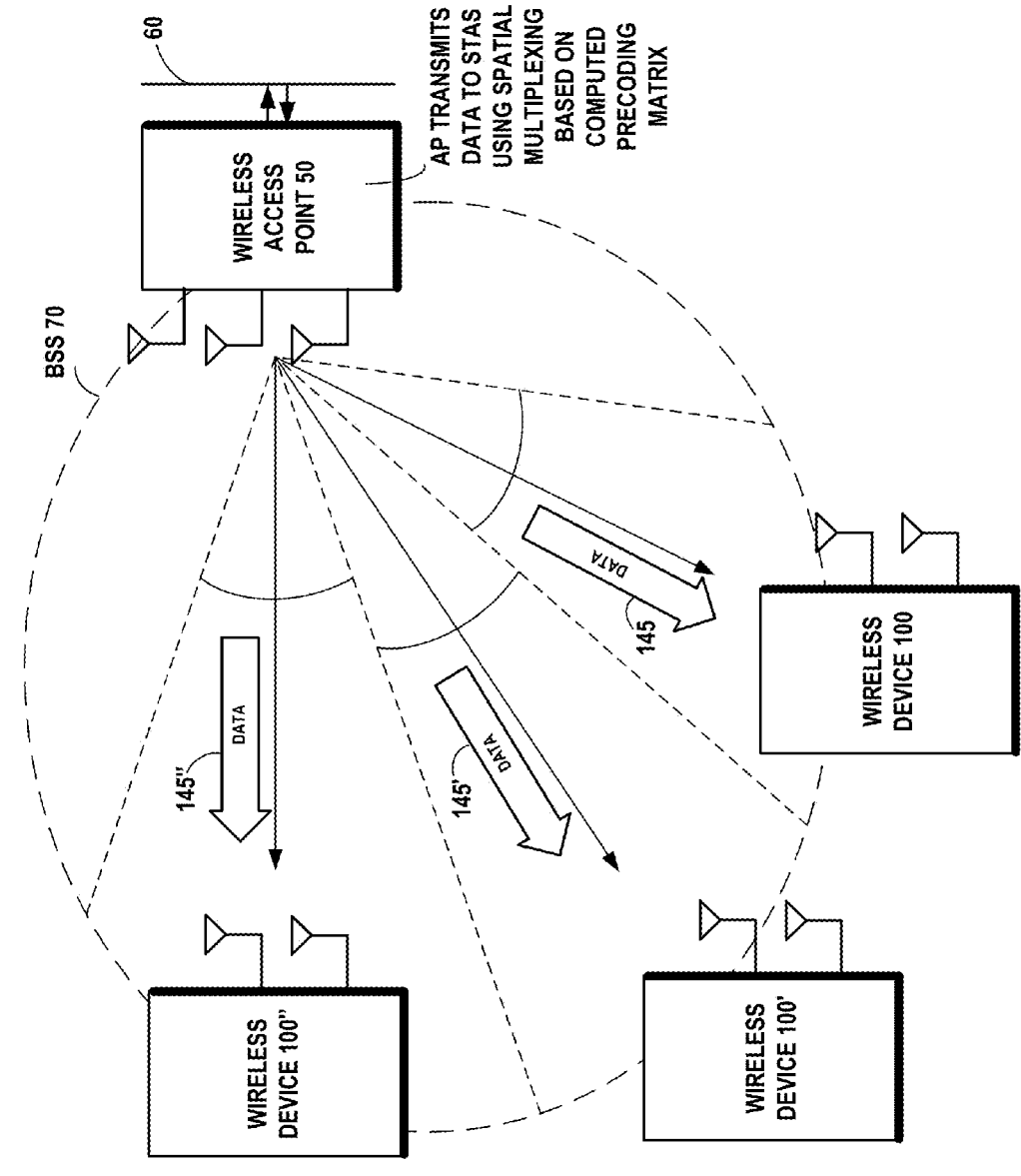
FIG. 1F illustrates the example network diagram of FIG. 1E, wherein the access point transmits one or more spatially multiplexed frames based on the computed precoding matrix, comprising data of one or more of the wireless terminal devices associated to the wireless network managed by the access node.

FIG. 1F illustrates the example network diagram of FIG. 1E, wherein the access point 50 transmits one or more MU-PPDUs carrying the data 145, 145', and 145" of the respective wireless terminals 100, 100', 100" associated to the wireless network 70 managed by the access point 50. The MU-PPDU is generated at the access point 50 by applying the precoding matrix. The wireless terminal device 100, etc. decode their data using receive processes like linear MMSE, and may send block acknowledgement frame to the access point 50 to indicate successful reception of one or more MPDUs in the A-MPDU received, according to an example embodiment of the invention.

Figure 2A:
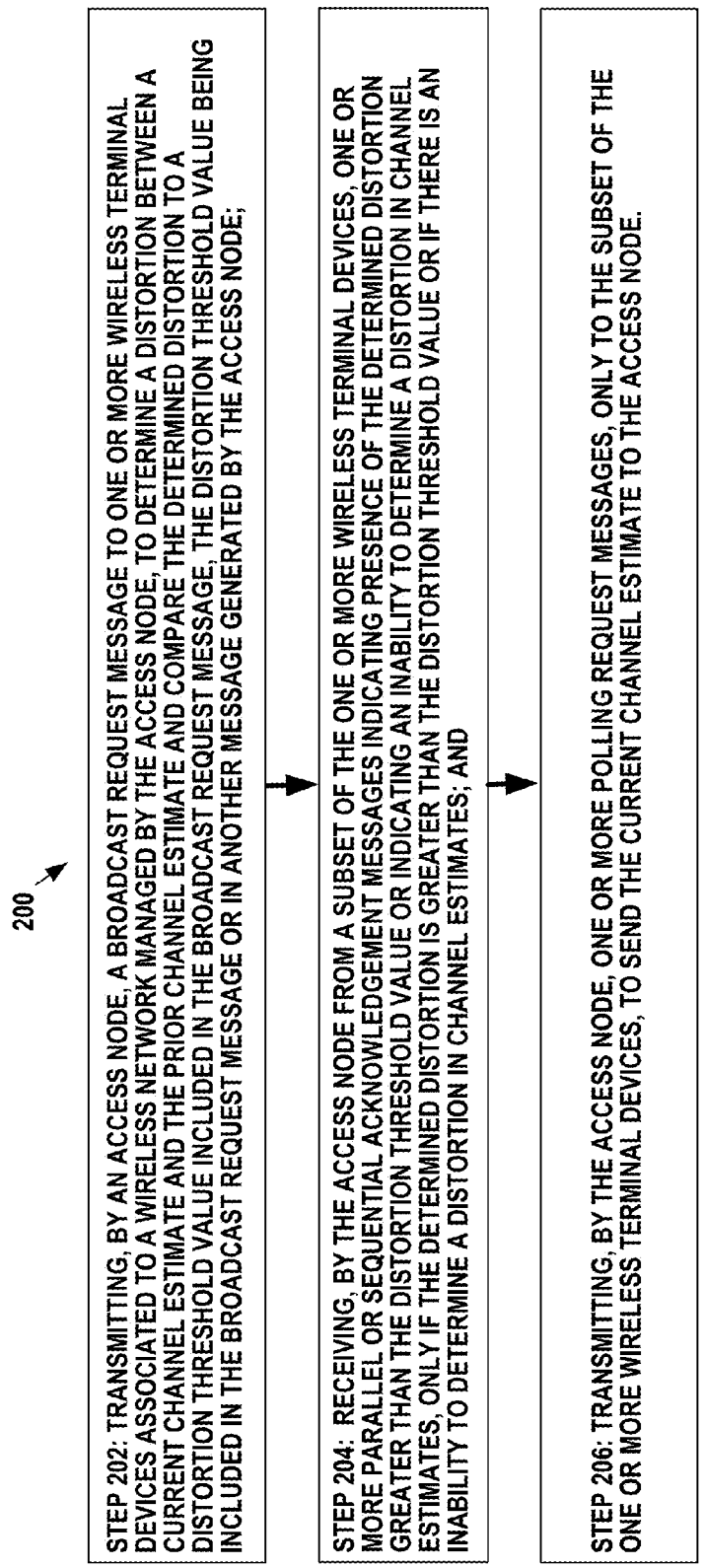
FIG. 2A is an example flow diagram of operational steps in the access node, according to an example embodiment of the invention.

FIG. 2A is an example flow diagram 200 of operational steps in an access node, according to an example embodiment of the invention. The steps of the flow diagram represent computer code instructions stored in the RAM and/or ROM memory, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 202: transmitting, by an access node, a broadcast request message to one or more wireless terminal devices associated to a wireless network managed by the access node, to determine a distortion between a current channel estimate and the prior channel estimate and compare the determined distortion to a distortion threshold value. The distortion threshold value may be included in the broadcast request message or in another message generated by the access node;

Step 204: receiving, by the access node from a subset of the one or more wireless terminal devices, one or more parallel or sequential acknowledgement messages indicating presence of the determined distortion greater than the distortion threshold value or indicating an inability to determine a distortion in channel estimates, only if the determined distortion is greater than the distortion threshold value or if there is an inability to determine a distortion in channel estimates; and Step 206: transmitting, by the access node, one or more polling request messages, only to the subset of the one or more wireless terminal devices, to send the current channel estimate to the access node.

FIG. 2B is an example flow diagram 250 of operational steps in a wireless terminal device, according to an example embodiment of the invention. The steps of the flow diagram represent computer code instructions stored in the RAM and/or ROM memory, which when executed by the central processing units (CPU), carry out the functions of the example embodiments of the invention. The steps may be carried out in another order than shown and individual steps may be combined or separated into component steps. Some of these steps may not be needed in some embodiments. Additional steps may be included in this sequence. The steps of the example method are as follows.

Step 252: storing, by a wireless device, a prior channel estimate that was previously transmitted to another wireless device in a wireless network;

Step 254: receiving, by the wireless device, a request message from the other device, to determine a distortion between a current channel estimate and the prior channel estimate and compare the determined distortion to a distortion threshold value, the request message being a broadcast request message or a measurement request message and the distortion value being either included in the request message, received in another message, or a preconfigured value;

Step 256: determining, by the wireless device, the distortion between the current channel estimate and the prior channel estimate and comparing the determined distortion to the distortion threshold value; and Step 258: transmitting, by the wireless device, one or more parallel or sequential messages to the other device, indicating presence of the determined distortion greater than the distortion threshold value or indicating an inability to determine a distortion in channel estimates.

In an embodiment, the wireless terminal device may transmit the current channel estimate to the access node if the determined distortion is greater than a preconfigured or stored distortion threshold value. In that embodiment, the determining may be based on periodical checking.

FIG. 3A is an example illustration of the MU-MIMO feedback process with parallel acknowledgements by STAs, according to an example embodiment of the invention. STA1 and STA3 are identified by their respective ZC-sequences, ZC-1 and ZC-3, in this example.

FIG. 3B is an example illustration of the MU-MIMO feedback process with series acknowledgements by STAs, according to an example embodiment of the invention. In another example embodiment of the invention, all STAs send series acknowledgement frames in response to the NDP in orthogonal time slots. The inter frame spacing may be kept short by using xIFS period, where x could stand for R, P etc so as to reduce the overhead. The acknowledgement frame of a STA carries the 1-bit field to indicate if the threshold is exceeded. It may also include the channel distortion value and the AP may poll the STA based on this value.

Figure 4:
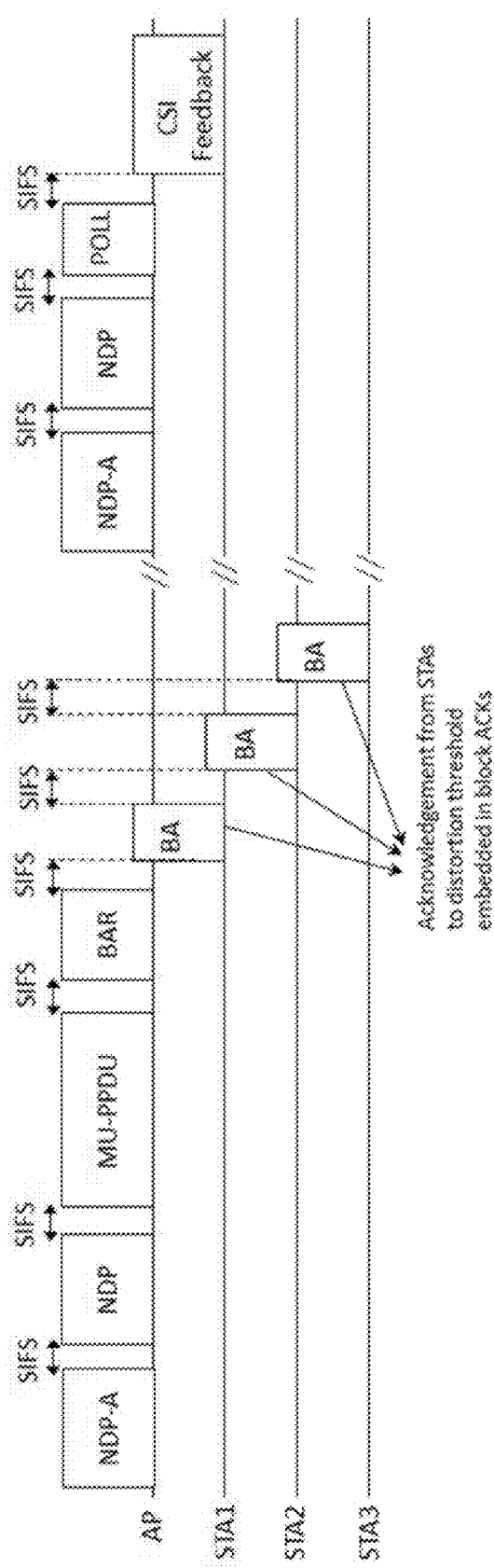
FIG. 4 is an example illustration of the signaling for spatial multiplexing with acknowledgements by STAs embedded in the Block Acknowledgement (BA) frames of STAs, according to an example embodiment of the invention.

FIG. 4 is an example illustration of the MU-MIMO feedback process with acknowledgement to the distortion threshold by the STAs embedded in the BA frames. A 1-bit field may be reserved in the BA frame of a STA, which is set to 1 by the STA if its distortion exceeds the distortion threshold.

Figure 5:
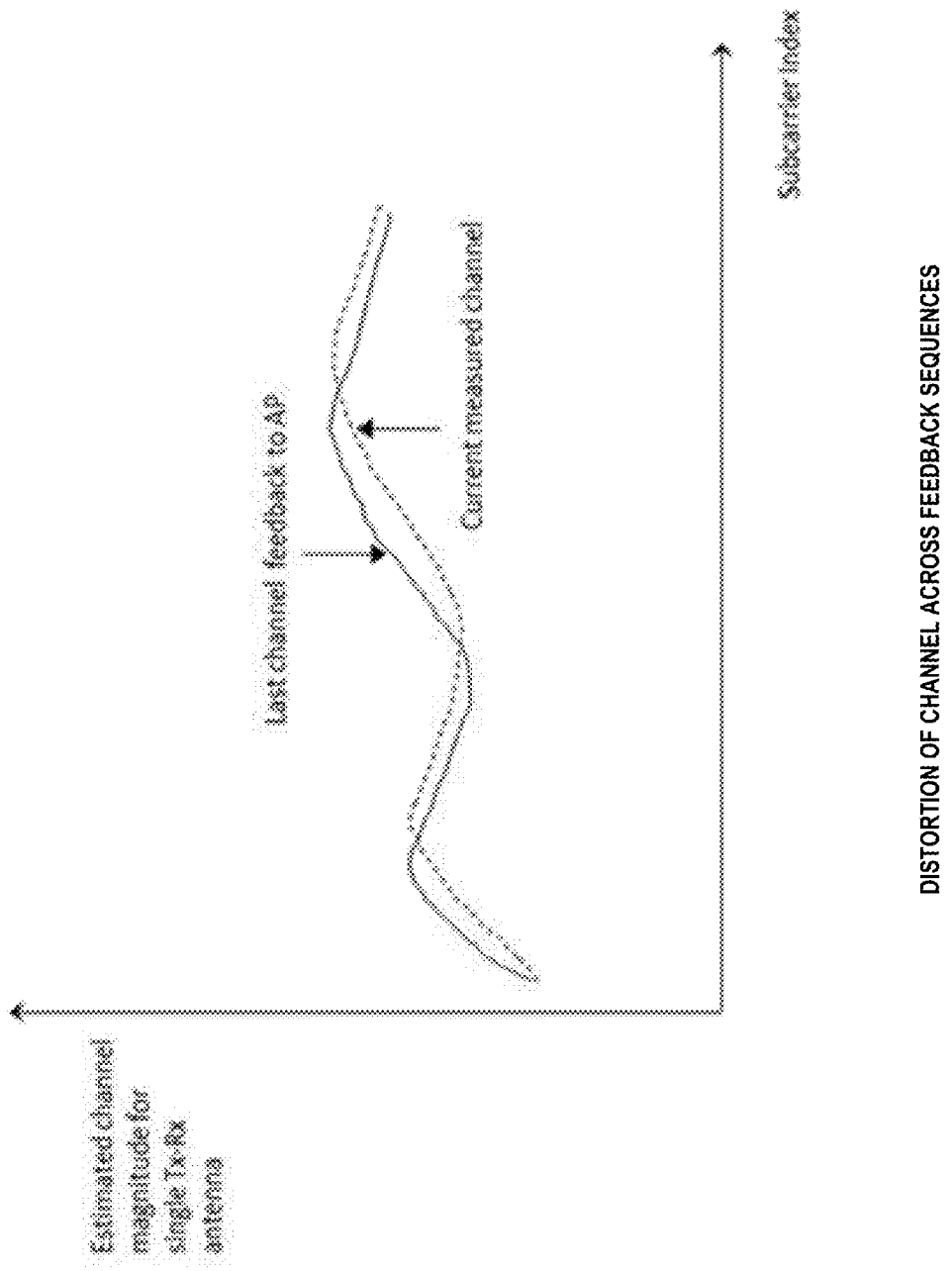
FIG. 5 is an example illustration of a plot of the channel magnitude across the subcarriers for the past and the current channel estimate, according to an example embodiment of the invention. The figure shows the channel variation of a wireless channel with a single transmit and receive antenna; the channel distortion is measure of this variation.

FIG. 5 is an example plot of the channel magnitude across the subcarriers for the past and the current channel estimate, according to an example embodiment of the invention. The figure shows the variation of a wireless channel for a single transmit and receive antenna. When there is more than one antenna at the transmitter or receiver device, similar channel variation may be observed for each pair of single antenna links between the transmitter and the receiver. The channel distortion is a measure of the overall variation across all links.

Figure 6:
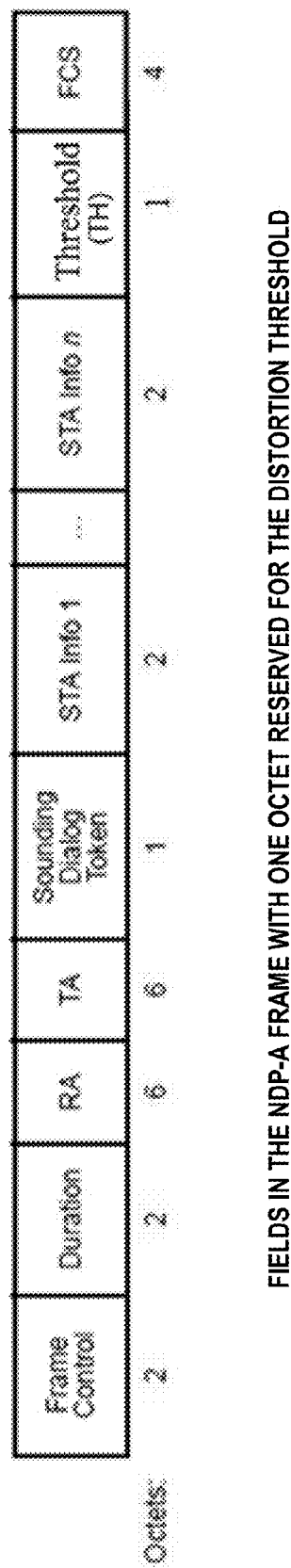
FIG. 6 is an example illustration of fields in the null data packet announce (NDP-A) frame with one octet reserved for the distortion threshold, according to an example embodiment of the invention.

In accordance with an example embodiment of the invention, additional signaling and processing may be added to the feedback mechanism described above. The NDP-A frame broadcast by the AP carries an additional field indicating a channel distortion threshold TH. FIG. 6 is an example illustration of fields in the NDP-A frame, and shows the one octet field reserved for the distortion threshold, according to an example embodiment of the invention. In one example, the threshold value may be represented as signed 8 bit integer.

Each STA, irrespective of the MU-MIMO group it participates in, stores the most recent channel estimate that it uses for sending feedback to the AP. Similarly, the AP stores the most recent channel feedback available to it from the STAs. When a participating STA i receives both the NDP and the NDP-A frames, it also computes the distortion $D_i$ between the current channel estimate $H_{i,n}^{curr}$ and the stored channel estimate $H_{i,n}^{prev}$. The channel distortion is taken as the relative power of the error (in dBc) between the two estimates as follows, $$D_i = 10 \log_{10}(\Sigma_{n=1}^{Nc} \|H_{i,n}^{curr} - H_{i,n}^{prev}\|^2) - 10 \log_{10}(\Sigma_{n=1}^{Nc} \|H_{i,n}^{prev}\|^2) \quad (1)$$

where $\| \|$ is the Forbenius norm of a matrix. For a slow varying channel as shown in FIG. 5, the distortion will be very low. In one example, the distortion threshold includes the quantization noise by replacing the channel estimates $H_{i,n}^{curr}$ and $H_{i,n}^{prev}$ with their quantized values respectively.

The AP sets the channel distortion threshold TH after it identifies the set of participating STAs in MU-MIMO. Setting a very low threshold will imply that accurate feedback is required and therefore all STAs should qualify for feedback. On the other hand, a large value of threshold could be used to get selective feedback from STAs.

In accordance with an example embodiment of the invention, the threshold is set to achieve a desired signal-to-noise ratio (SNR) performance of STAs while reducing the amount of feedback. For example, studies have shown that a feedback distortion of −25dBc or less is required to have a received SNR of 25 dB at STAs. Therefore, STAs that have channel distortion below −25 dBc are not required to send their feedback. This variation of channel distortion across STAs is a result of different mobility pattern of STAs, and is a common scenario in wireless deployments. Consequently, selective feedback from STAs will reduce overhead while guaranteeing a desired SINR at STAs.

Figure 7:
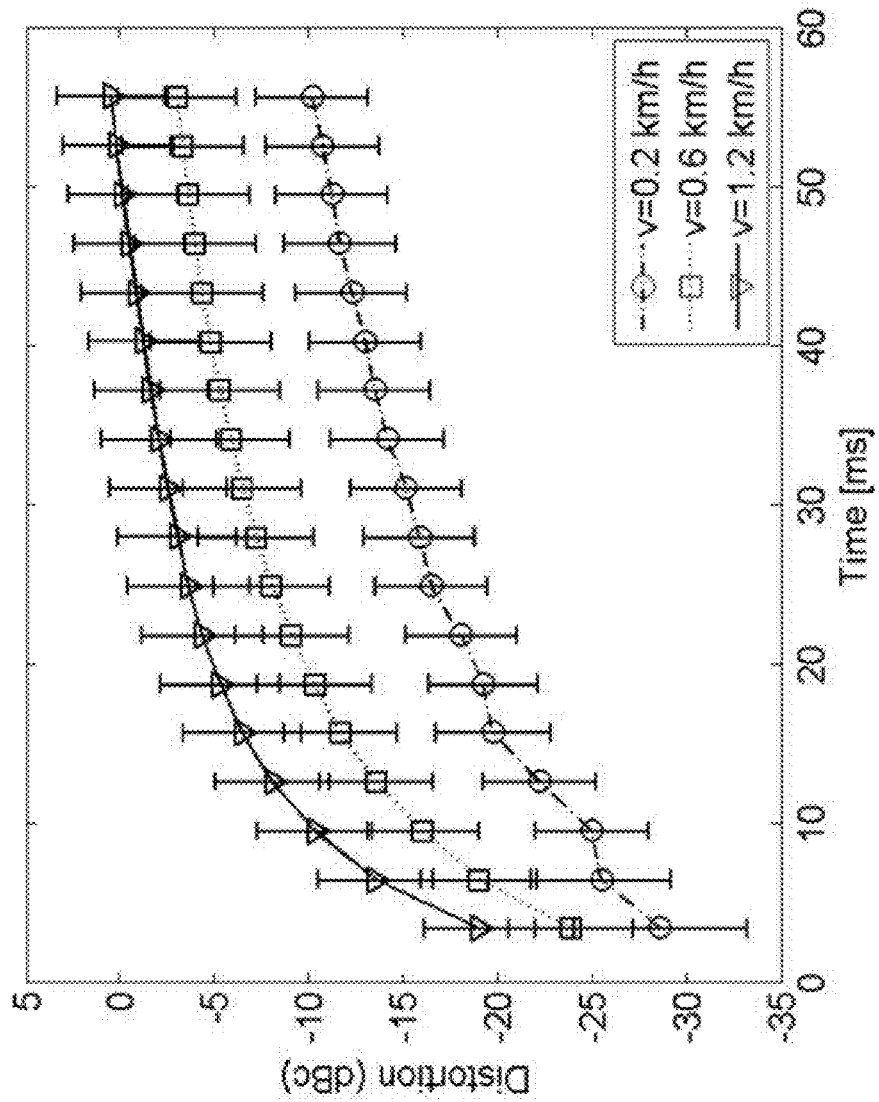
FIG. 7 is an example illustration of a plot of channel distortion over time for different mobility scenarios, according to an example embodiment of the invention.

FIG. 7 is an example illustration of a plot of channel distortion of an IEEE 802.11 channel with different mobility scenarios, according to an example embodiment of the invention. The distortion increases as the time between the two channel measurements is increased; and increases with the environmental mobility that measured in km/hr. Using the measurements from the above plot, if we set a distortion threshold of −20 dBc, we may use the channel measurement of STA with 0.2 Km/h mobility that is 25 ms old without exceeding the distortion threshold. Consequently, no new feedback is required for this STA to do MU-MIMO transmission within a period of 25 ms. Thus, there is a reduction in overhead of feedback that equals the size of the feedback frame of the STA. This is further illustrated by the following example: Consider three STAs having the three time-distortion curves shown in FIG. 7. Assume the AP has 3 antennas, and each STA has 1 receive antenna. The total feedback overhead is $O=+O_1+O_2+O_3$ where $O_i$ is the size of feedback frame from STA $i, i=1 \ldots 3$, respectively. For example, this overhead is 7965 bits with givens rotation of feedback matrix, ½ rate coding, QPSK modulation and 80 MHz bandwidth. Further, assume the previous channel estimates of all the STAs are known to the AP and are each 10 ms old.

Figure 8:
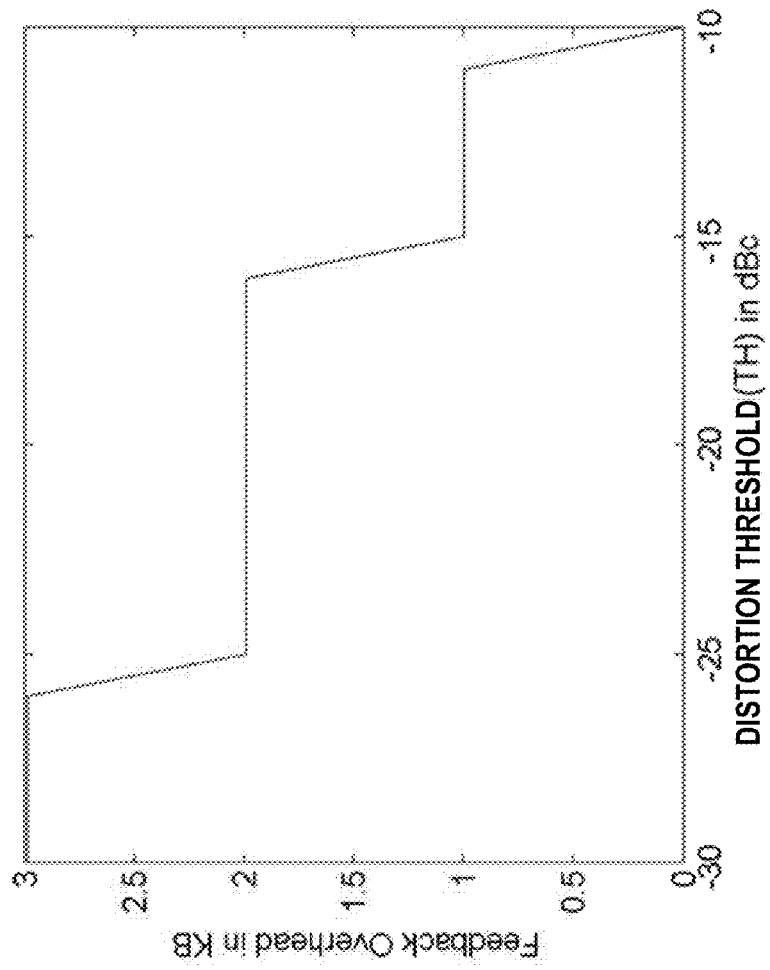
FIG. 8 is an example illustration of a plot of channel estimation overhead with 3 STAs in relation to the distortion threshold, according to an example embodiment of the invention.

FIG. 8 is an example illustration of a plot of feedback overhead O with 3 STAs in relation to the distortion threshold TH, according to an example embodiment of the invention. In this figure, when TH is set very low, all STAs send their feedback, and the overhead is the sum of all STA's overhead. As it is increased, STA with v=0.2 km/h if it has distortion lower than TH does not qualify for feedback. Hence, there is a reduction in the feedback overhead. As the value of TH is further increased, fewer STAs qualify for feedback until finally no feedback is needed. Note that the distortion threshold affects the performance of MU-MIMO and should be set accordingly. Therefore, this invention proposes the AP reduce the feedback overhead once the threshold is set.

In one example, the distortion threshold TH may also be set according to the prevalent load in the network, power limitation of STAs, and computational capabilities of AP and STAs. In another example, the distortion threshold may be set for each STA to do finer control of the feedback overhead.

Each STA i checks whether $D_i$ is greater than TH, in which case it qualifies itself to participate in the feedback process. Further, if no previous channel estimate was made by the STA, for e.g. during the first feedback phase, it cannot compute the channel distortion and qualifies by default. If the distortion measured by the STA is less than or equal to the threshold set by AP, the STA does not qualify for feedback.

Figure 9:
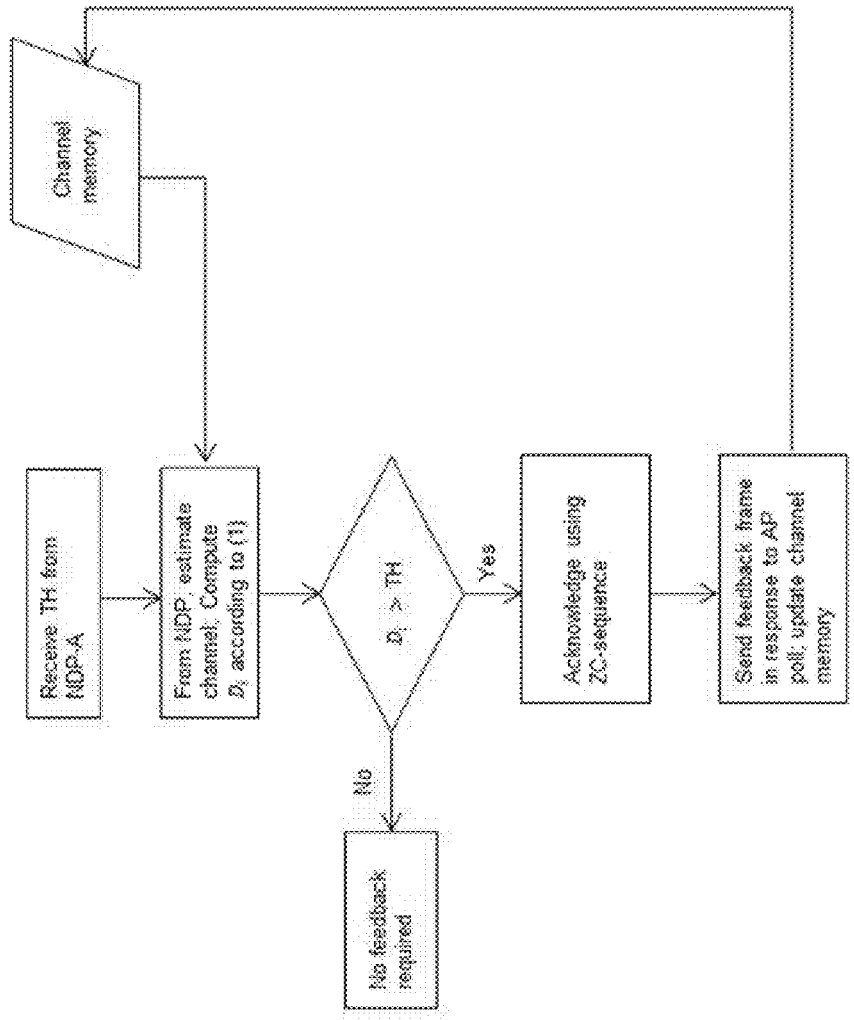
FIG. 9 is an example illustration of a flowchart describing the signaling process for an STA to send channel estimate to the access point (AP), according to an example embodiment of the invention.

FIG. 9 is an example illustration of a flowchart describing the feedback process for STA, according to an example embodiment of the invention. Following a SIFS delay after the NDP frame, each qualified STA sends a frame containing its unique ZC-sequence. Each STA in the network is identified by a ZC-sequence that is generated with a cyclic shift of the ZC root sequence. This shift is an identifier of the STA which is assigned to it during the STA-AP association process. The transmitted frame containing the sequence is generated with the same OFDM/IFFT processing but has no preamble, or training fields like LTF etc. It is one or two OFDM symbols wide depending on the length of the sequence, and each symbol is prefixed with a cyclic prefix (CP). The symbols loaded on the OFDM subcarriers are generated from the frequency domain representation of the ZC-sequence. Details about the transmission scheme, complexity and implementation are available in the reference: Kim, Taejoon, et al. "Simultaneous polling mechanism for low power sensor networks using ZC sequences." IEEE 23rd International Symposium on *Personal Indoor and Mobile Radio Communications* (PIMRC), 2012, incorporated herein by reference.

Figure 10:
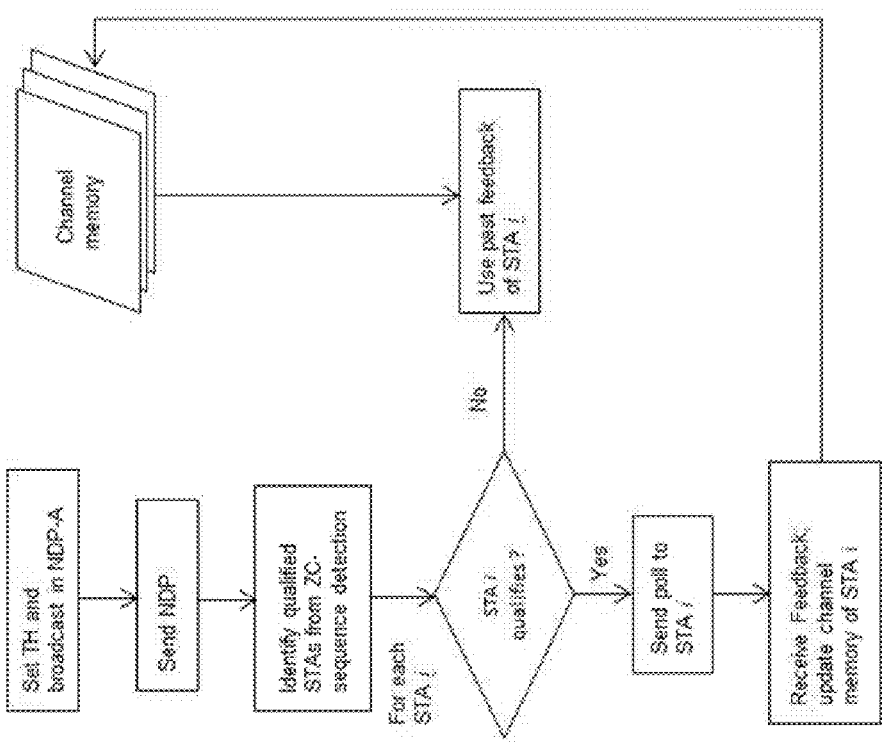
FIG. 10 is an example illustration of a flowchart describing the signaling process for an access point (AP) to obtain channel estimates from STAs, according to an example embodiment of the invention.

FIG. 10 is an example illustration of a flowchart describing the feedback process for AP, according to an example embodiment of the invention. The AP receives a frame from each of the qualified STA. These frames overlap with each other, and the AP does a ZC-sequence detection to extract the cyclic shifts present in the received frames. The detection is based on the strong auto-correlation and cross-correlation property of ZC-sequences. Once the cyclic shifts are known, the AP maps them back to know the set of qualified STAs. The AP sends a poll frame to each of qualified STAs to elicit feedback response. On receiving a poll frame, STA uses one of the four formats of feedback response to create the reply frame. Each qualified STA stores the current estimate of the channel in its memory. Similarly, on receiving a feedback frame from a STA, the AP updates the memory of channel feedback of the STA with the new channel feedback contents.

To generate the precoding matrix, AP uses the current feedback information of the qualified STAs, and the feedback information available in memory for the participating STAs that did not qualify. The MU-PPDU transmission then proceeds according to the 802.11ac standard mechanism followed by block acknowledgements from STAs.

In one example, the proposed signaling scheme may be applied across two different groups of participating STAs. The channel feedback obtained from a STA in a previous MU-TXOP may be used in another MU-TXOP to reduce the feedback overhead.

In another example, the proposed signaling scheme may also be used for an implicit feedback process. In this case, uplink frames from only a subset of STAs is requested in order to obtain the new channel estimates. The distortion threshold is set by the AP and the subset of STAs may be chosen based on either the parallel or the series acknowledgement procedure.

Figure 11:
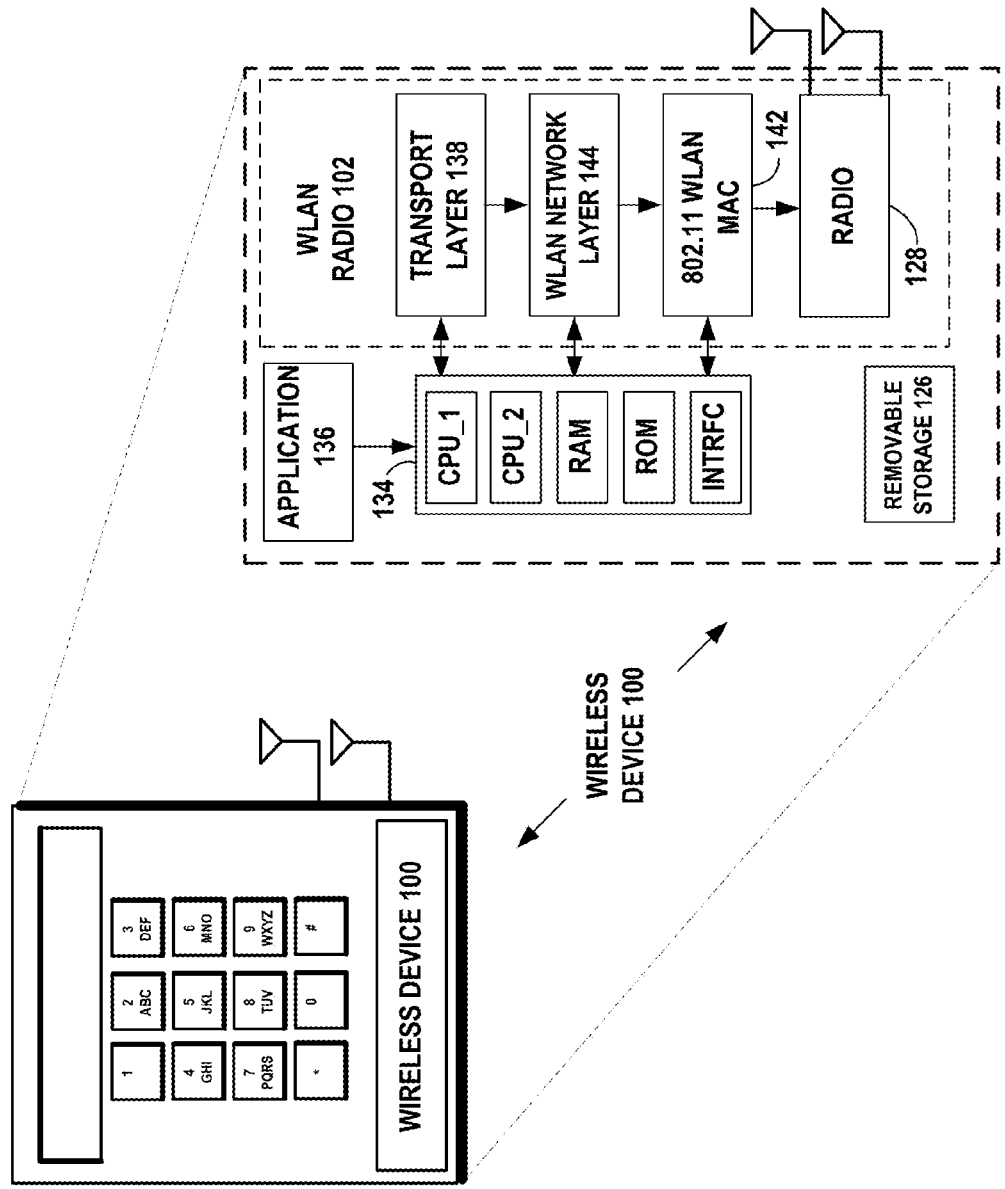
FIG. 11 is an example functional block diagram, illustrating an example wireless terminal device, according to an example embodiment of the invention.

FIG. 11 is an example functional block diagram, illustrating an example wireless terminal device 100, etc., according to an example embodiment of the invention.

The example wireless terminal device 100 may include a processor 134 that may include a dual or multi-core central processing unit CPU_1 and CPU_2, a RAM memory, a ROM memory, and an interface for a keypad, display, and other input/output devices. The example wireless terminal device 100, etc., may include a protocol stack, including the transceiver 128 and IEEE 802.11 MAC 142, which may be based, for example, on the IEEE 802.11 WLAN standard. The protocol stack may also include a network layer 144, a transport layer 138, and an application program 136.

Figure 13:
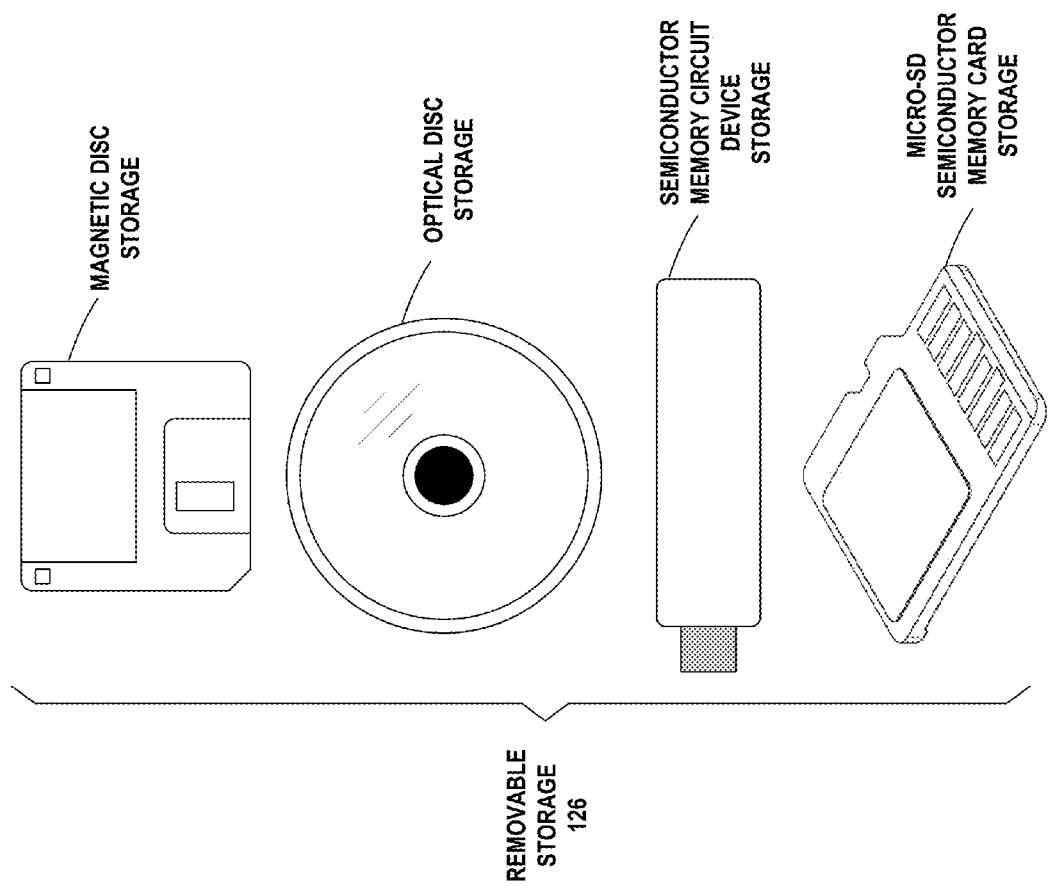
FIG. 13 illustrates an example embodiment of the invention, wherein examples of removable storage media are shown. The removable storage media are based on magnetic, electronic and/or optical technologies, such as magnetic disks, optical disks, semiconductor memory circuit devices and micro-SD memory cards (SD refers to the Secure Digital standard). The removable storage media are for storing data and/or computer program code as an example computer program product, in accordance with at least one embodiment of the present invention.

In an example embodiment, the interface circuits may interface with one or more radio transceivers, battery and other power sources, key pad, touch screen, display, microphone, speakers, ear pieces, camera or other imaging devices, etc. The RAM and ROM may be removable memory devices 126 such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor. An example of removable storage media 126, as shown in FIG. 13, may be based on magnetic, electronic and/or optical technologies. Examples of removable storage media 126 include magnetic disks, optical disks, semiconductor memory circuit devices and micro-SD memory cards (SD refers to the Secure Digital standard). The removable storage media 126 may store data and/or computer program code as an example computer program product, in accordance with at least one embodiment of the present invention.

Figure 12:
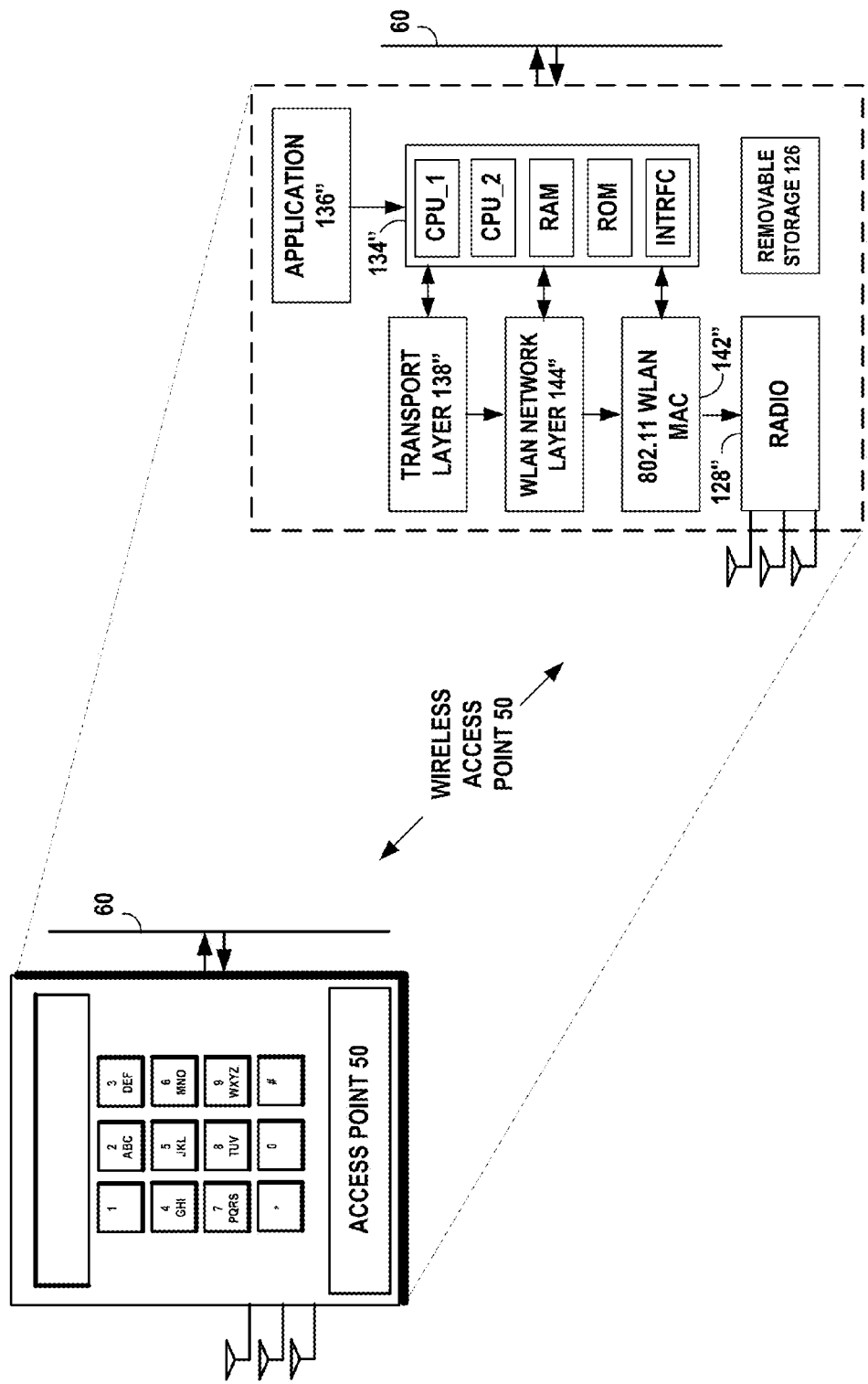
FIG. 12 is an example functional block diagram, illustrating an example access point device, according to an example embodiment of the invention.

FIG. 12 is an example functional block diagram, illustrating an example access point device 50, according to an example embodiment of the invention. The example access point device 50 may include a processor 134" that may include a dual or multi-core central processing unit CPU_1 and CPU_2, a RAM memory, a ROM memory, and an interface for a keypad, display, and other input/output devices. The example access point 50 may include a protocol stack, including the transceiver 128" and IEEE 802.11 MAC 142", which may be based, for example, on the IEEE 802.11 WLAN standard. The protocol stack may also include a network layer 144", a transport layer 138", and an application program 136".

In an example embodiment, the interface circuits may interface with one or more radio transceivers, battery and other power sources, key pad, touch screen, display, microphone, speakers, ear pieces, camera or other imaging devices, etc. The RAM and ROM may be removable memory devices 126" such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor. An example of removable storage media 126, as shown in FIG. 13, may be based on magnetic, electronic and/or optical technologies. Examples of removable storage media 126 may include magnetic disks, optical disks, semiconductor memory circuit devices and micro-SD memory cards (SD refers to the Secure Digital standard). The removable storage media 126 may store data and/or computer program code as an example computer program product, in accordance with at least one embodiment of the present invention.

FIG. 13 illustrates an example embodiment of the invention, wherein examples of removable storage media 126 are shown. The removable storage media are based on magnetic, electronic and/or optical technologies, such as magnetic disks, optical disks, semiconductor memory circuit devices and micro-SD memory cards (SD refers to the Secure Digital standard). The removable storage media 126 are for storing data and/or computer program code as an example computer program product, in accordance with at least one embodiment of the present invention.

In an example embodiment of the invention, wireless networks may include other sensor type networks and/or other networks. Examples of such networks include, for example cellular systems such as Global System for Mobile Communications (GSM), Wideband Code Division Multiple Access (W-CDMA), High Speed Packet Access (HSPA), Long Term Evolution (LTE), LTE Advanced (LTE-A), International Mobile Telecommunications Advanced (IMT-A), CDMA, Wireless Metropolitan Area Networks (WMAN) and Broadband Wireless Access (BWA) (LMDS, WiMAX, AIDAAS and HiperMAN), or the like networks. Examples of such networks include, for example, short-range networks such as Bluetooth, Zigbee, IEEE 802.11, Digital Enhanced Cordless Telecommunications (DECT), HiperLAN, Radio Frequency Identification (RFID), Wireless USB, DSRC (Dedicated Short-range Communications), Near Field Communication, wireless sensor networks, EnOcean; TransferJet, Ultra-wideband (UWB from WiMedia Alliance), WLAN, WiFi, and HiperLAN.

In an example embodiment, a signaling method, comprising a subset of features of the Wi-Fi example embodiments, is provided between at least one wireless device and at least one access node for explicit channel feedback. It avoids unnecessary feedback from STAs which observe relatively stable channels.

In accordance with an example embodiment of the invention, the STAs may be, for example, a miniature device such as a key fob, smart card, jewelry, or the like. The STAs may be, for example, a larger device such as a cell phone, smart phone, flip-phone, PDA, graphic pad, or even larger devices such as a laptop computer, an automobile, and the like.

In an example embodiment of the invention, an apparatus comprises:

means for transmitting, by an access node, a broadcast request message to one or more wireless terminal devices associated to a wireless network managed by the access node, to determine a distortion between a current channel estimate and the prior channel estimate and compare the determined distortion to a distortion threshold value included in the broadcast request message, the distortion threshold value being included in the broadcast request message or in another message generated by the access node;

means for receiving, by the access node from a subset of the one or more wireless terminal devices, one or more parallel or sequential acknowledgement messages indicating presence of the determined distortion greater than the distortion threshold value or indicating an inability to determine a distortion in channel estimates, only if the determined distortion is greater than the distortion threshold value or if there is an inability to determine a distortion in channel estimates; and means for transmitting, by the access node, one or more polling request messages, only to the subset of the one or more wireless terminal devices, to send the current channel estimate to the access node.

In an example embodiment of the invention, an apparatus comprises:

means for storing, by a wireless device, a prior channel estimate that was previously transmitted to another wireless device in a wireless network;

means for receiving, by the wireless device, a request message from the other device, to determine a distortion between a current channel estimate and the prior channel estimate and compare the determined distortion to a distortion threshold value, the request message being a broadcast request message or a measurement request message and the distortion value being either included in the request message, received in another message, or a preconfigured value;

means for determining, by the wireless device, the distortion between the current channel estimate and the prior channel estimate and comparing the determined distortion to the distortion threshold value; and means for transmitting, by the wireless device, one or more parallel or sequential messages to the other device, indicating presence of the determined distortion greater than the distortion threshold value or indicating an inability to determine a distortion in channel estimates.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments of the invention have been disclosed, a person skilled in the art will understand that changes can be made to the specific example embodiments without departing from the spirit and scope of the invention.

What is claimed is:

1. A method, comprising:
   transmitting, by an access node, a broadcast request message to one or more wireless terminal devices associated with a wireless network managed by the access node;
   transmitting a distortion threshold value in at least one of the broadcast request message and another message;

receiving, by the access node from a subset of the one or more wireless terminal devices, one or more parallel or sequential acknowledgement messages each indicating presence of a determined distortion greater than the distortion threshold value or indicating an inability to determine a distortion in channel estimates, wherein each determined distortion indicates a change between a prior channel estimate and a current channel estimate that is estimated from the broadcast request message received by a respective wireless terminal device in the subset; and transmitting, by the access node, one or more polling request messages, only to the subset of the one or more wireless terminal devices, indicating requests to send the current channel estimate from each respective wireless terminal device in the subset to the access node.

2. The method of claim 1, wherein the broadcast request message is a null data packet announcement frame that includes the distortion threshold value, which is set by the access node.

3. The method of claim 1, wherein the one or more parallel or sequential acknowledgement messages each include a transmission pattern having a Zadoff-Chu sequence identifying a sending wireless terminal device in the subset of the one or more wireless terminal devices.

4. The method of claim 3, further comprising:
computing, by the access node, a Zadoff-Chu sequence detection algorithm operating on the Zadoff-Chu sequence received in each of the one or more parallel or sequential acknowledgement messages, to identify each wireless terminal device in the subset.

5. The method of claim 1, further comprising:
receiving by the access node, one or more messages from the subset of the one or more wireless terminal devices in response to the one or more polling request messages, wherein the one or more messages include the current channel estimate from each wireless terminal device in the subset.

6. The method of claim 5, further comprising:
computing, by the access node, a precoding matrix based on the current channel estimates received in the one or more messages; and
transmitting, by the access node based on the computed precoding matrix, one or more spatially multiplexed frames comprising data of one or more of the wireless terminal devices associated with the wireless network managed by the access node.

7. A method, comprising:
storing, by a first wireless device, a prior channel estimate that was previously transmitted to a second wireless device in a wireless network;
receiving, by the first wireless device, a request message from the second wireless device, indicating a request to determine a distortion between a current channel estimate and the prior channel estimate and to compare the determined distortion to a distortion threshold value, the request message being a broadcast request message or a measurement request message and the distortion threshold value being either included in the request message, received by the first wireless device in another message, or a preconfigured value stored on the first wireless device;
determining, by the first wireless device, the distortion between the current channel estimate and the prior channel estimate and comparing the determined distortion to the distortion threshold value; and transmitting, by the first wireless device to the second wireless device, one or more parallel or sequential messages indicating presence of the determined distortion greater than the distortion threshold value.

8. The method of claim 7, wherein the first wireless device is a wireless terminal device associated with the second wireless device, which is a wireless access node device, the method comprising transmitting, by the wireless terminal device, the current channel estimate to the wireless access node device if the determined distortion is greater than the distortion threshold value.

9. The method of claim 7, wherein the first wireless device is a wireless terminal device associated with the second wireless device, which is a wireless access node device, and wherein the one or more parallel or sequential messages each includes a transmission pattern having a Zadoff-Chu sequence identifying the wireless terminal device.

10. The method of claim 7, wherein the first wireless device is a wireless terminal device associated with the second wireless device, which is a wireless access node device, the method comprising:
receiving, by the wireless terminal device, one or more polling request messages comprising information indicating a feedback request; and
transmitting, by the wireless terminal device, one or more messages to the wireless access node device, in response to the one or more polling request messages, including the current channel estimate.

11. The method of claim 10, further comprising:
receiving, by the wireless terminal device, one or more spatially multiplexed frames based on a computed precoding matrix, comprising data of the wireless terminal device and data of one or more other wireless terminal devices associated with the wireless network managed by the wireless access node device; and
applying spatial processing to decode the data of the wireless terminal device.

12. An apparatus, comprising:
at least one processor;
at least one memory including computer program code;
the at least one memory and the computer program code configured to, with the at least one processor, cause the apparatus at least to:
transmit a broadcast request message to one or more wireless terminal devices associated with a wireless network managed by the apparatus;
transmit a distortion threshold value in at least one of the broadcast request message and another message;
receive from a subset of the one or more wireless terminal devices, one or more parallel or sequential acknowledgement messages each indicating presence of a determined distortion greater than the distortion threshold value or indicating an inability to determine a distortion in channel estimates, wherein each determined distortion indicates a change between a prior channel estimate and a current channel estimate that is estimated from the broadcast request message received by a respective wireless terminal device in the subset; and
transmit one or more polling request messages only to the subset of the one or more wireless terminal devices, indicating requests to send the current channel estimate from each wireless terminal device in the subset to the apparatus.

13. The apparatus of claim 12, wherein the broadcast request message is a null data packet announcement frame that includes the distortion threshold value, which is set by the apparatus.

14. The apparatus of claim 12, wherein the one or more parallel or sequential acknowledgement messages each include a transmission pattern having a Zadoff-Chu sequence identifying a sending wireless terminal device in the subset of the one or more wireless terminal devices.

15. The apparatus of claim 14, wherein the at least one memory and the computer program code are configured to, with the at least one processor, cause the apparatus at least to:
compute a Zadoff-Chu sequence detection algorithm operating on the Zadoff-Chu sequence received in each of the one or more parallel or sequential acknowledgement messages, to identify each wireless terminal device in the subset.

16. An apparatus, comprising:
at least one processor;
at least one memory including computer program code;
the at least one memory and the computer program code configured to, with the at least one processor, cause the apparatus at least to:
store a prior channel estimate that was previously transmitted to a wireless device in a wireless network;
receive a request message from the wireless device indicating a request to determine a distortion between a current channel estimate and the prior channel estimate and compare the determined distortion to a distortion threshold value, the request message being a broadcast request message or a measurement request message and the distortion threshold value being either included in the request message, received in another message, or a preconfigured value;
determine the distortion between the current channel estimate and the prior channel estimate and compare the determined distortion to the distortion threshold value; and
transmit one or more parallel or sequential messages to the wireless device indicating presence of the determined distortion greater than the distortion threshold value.

17. The apparatus of claim 16, wherein the apparatus is a wireless terminal device associated with the wireless device, which is a wireless access node device, and wherein the request message is a null data packet announcement frame that includes the distortion threshold value, which is set by the access node device.

18. The apparatus of claim 16, wherein the apparatus is a wireless terminal device associated with the wireless device, which is a wireless access node device, and wherein the one or more parallel or sequential messages each includes a transmission pattern having a Zadoff-Chu sequence identifying the apparatus.

19. A computer program product comprising computer executable program code recorded on a computer readable non-transitory storage medium, the computer executable program code, when executed by a processor, causes an apparatus to:
transmit a broadcast request message to one or more wireless terminal devices associated with a wireless network managed by the apparatus;
transmit in another message, or include in the broadcast request message, a distortion threshold value;
receive from a subset of the one or more wireless terminal devices, one or more parallel or sequential acknowledgement messages each indicating presence of a determined distortion greater than the distortion threshold value or indicating an inability to determine a distortion in channel estimates, wherein each determined distortion indicates a change between a prior channel estimate and a current channel estimate that is estimated from the broadcast request message received a respective wireless terminal device in the subset; and
transmit one or more polling request messages only to the subset of the one or more wireless terminal devices to send the current channel estimate from each wireless terminal device in the subset to the apparatus.

20. A computer program product comprising computer executable program code recorded on a computer readable non-transitory storage medium, the computer executable program code, when executed by a processor, causes an apparatus to:
store a prior channel estimate that was previously transmitted to a wireless device in a wireless network;
receive a request message from the wireless device indicating a request to determine a distortion between a current channel estimate and the prior channel estimate and compare the determined distortion to a distortion threshold value, the request message being a broadcast request message or a measurement request message and the distortion threshold value being either included in the request message, received in another message, or a preconfigured value;
determine the distortion between the current channel estimate and the prior channel estimate and compare the determined distortion to the distortion threshold value; and
transmit one or more parallel or sequential messages to the wireless device indicating presence of the determined distortion greater than the distortion threshold value.

* * * * *